United States Patent
Kwak et al.

(10) Patent No.: US 11,664,912 B2
(45) Date of Patent: *May 30, 2023

(54) APPARATUS AND METHOD FOR TRANSMITTING AND RECEIVING BROADCAST SIGNAL

(71) Applicant: LG ELECTRONICS INC., Seoul (KR)

(72) Inventors: Minsung Kwak, Seoul (KR); Seungryul Yang, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,442

(22) Filed: Feb. 3, 2021

(65) Prior Publication Data
US 2021/0184778 A1     Jun. 17, 2021

Related U.S. Application Data

(63) Continuation of application No. 16/725,066, filed on Dec. 23, 2019, now Pat. No. 10,944,492, which is a
(Continued)

(51) Int. Cl.
*H04H 20/42* (2008.01)
*H04L 69/22* (2022.01)
(Continued)

(52) U.S. Cl.
CPC ............ *H04H 20/42* (2013.01); *H04H 20/59* (2013.01); *H04H 60/72* (2013.01);
(Continued)

(58) Field of Classification Search
None
See application file for complete search history.

(56) References Cited

U.S. PATENT DOCUMENTS 10,594,417 B2   3/2020  Kwak et al.
10,944,492 B2*  3/2021  Kwak ................. H04L 69/04
(Continued)

FOREIGN PATENT DOCUMENTS

KR   10-2010-0105314 A    9/2010
WO   WO 2015/133770 A1    9/2015

OTHER PUBLICATIONS

ATSC, "A/331: ATSC Candidate Standard: Signaling, Delivery, Synchronization, and Error Protection", Doc. S33-174r1, Advanced Television Systems Committee, Jan. 5, 2016, total 133 pages.
(Continued)

*Primary Examiner* — Phirin Sam
(74) *Attorney, Agent, or Firm* — Birch, Stewart, Kolasch & Birch, LLP

(57) ABSTRACT

A method for delivering data in a digital transmitter including generating service layer signaling (SLS) information comprising information for discovery and acquisition of at least one content component: generating service list table (SLT) information including bootstrap information for acquiring the SLS information; encapsulating the at least one content component, the SLS information and the SLT information via UDP/IP; and transmitting a broadcast signal comprising the at least one content component, the SLS information and the SLT information.

16 Claims, 22 Drawing Sheets

Related U.S. Application Data continuation of application No. 16/070,226, filed as application No. PCT/KR2017/000466 on Jan. 13, 2017, now Pat. No. 10,594,417.

(60) Provisional application No. 62/339,038, filed on May 19, 2016, provisional application No. 62/302,187, filed on Mar. 2, 2016, provisional application No. 62/287,939, filed on Jan. 28, 2016, provisional application No. 62/278,960, filed on Jan. 14, 2016.

(51) Int. Cl.
| | | |
|---|---|---|
| *H04L 65/70* | (2022.01) | |
| *H04L 69/16* | (2022.01) | |
| *H04L 69/00* | (2022.01) | |
| *H04H 60/72* | (2008.01) | |
| *H04L 65/80* | (2022.01) | |
| *H04L 69/04* | (2022.01) | |
| *H04L 61/5069* | (2022.01) | |
| *H04L 65/611* | (2022.01) | |
| *H04H 20/59* | (2008.01) | |

(52) U.S. Cl.
CPC ........ *H04L 61/5069* (2022.05); *H04L 65/611* (2022.05); *H04L 65/70* (2022.05); *H04L 65/80* (2013.01); *H04L 69/02* (2013.01); *H04L 69/04* (2013.01); *H04L 69/16* (2013.01); *H04L 69/22* (2013.01)

(56) References Cited

U.S. PATENT DOCUMENTS

| | | |
|---|---|---|
| 2010/0306618 A1 | 12/2010 | Kim et al. |
| 2011/0103300 A1 | 5/2011 | Vare et al. |
| 2016/0127199 A1 | 5/2016 | Ding et al. |
| 2016/0164943 A1 | 6/2016 | Walker et al. |
| 2016/0205158 A1 | 7/2016 | Lo et al. |
| 2016/0357712 A1* | 12/2016 | Zoon ................... G06F 40/258 |
| 2018/0139476 A1 | 5/2018 | Deshpande |
| 2018/0152258 A1 | 5/2018 | Deshpande |
| 2018/0309527 A1 | 10/2018 | Deshpande |
| 2019/0319725 A1* | 10/2019 | Lee ........................ H04H 20/72 |
| 2021/0195253 A1* | 6/2021 | Yang ................... H04N 21/434 |

OTHER PUBLICATIONS

Min Sung Kwak, "Transmission and Service Configuration of ATSC 3.0 Next Generation Broadcasting System, and Signaling method thereof", The Korean institute of Broadcast and Media Engineers. Broadcasting and Media, vol. 20, No. 4, Oct. 2015, total 11 pages.

Motion Picture Laboratories, Inc., "Common Metadata 'rnd' Namespace Showing Changes from 1.2f", TR-META-CM, Version: 2.0 draft v0.97, Jan. 3, 2013, pp. 1-76.

* cited by examiner

FIG. 3

| Syntax | No. of Bits | Format |
|---|---|---|
| LLS_table() { | | |
|    LLS_table_id | 8 | uimsbf |
|    provider_id | 8 | uimsbf |
|    LLS_table_version | 8 | uimsbf |
|    switch (LLS_table_id) { | | |
|       case 0x01: | | |
|          SLT | var | See. 6.3 |
|          break; | | |
|       case 0x02: | | |
|          RRT | var | See Annex F |
|          break; | | |
|       case 0x03: | | |
|          System Time | var | See. 6.4 |
|          break; | | |
|       case 0x04: | | |
|          CAP | var | See. 6.5 |
|          break; | | |
|       default: | | |
|          reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string |

(t4010)

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       SrcFlow | 0..1 | srcFlowType |
|       RepairFlow | 0..1 | rprFlowType |

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
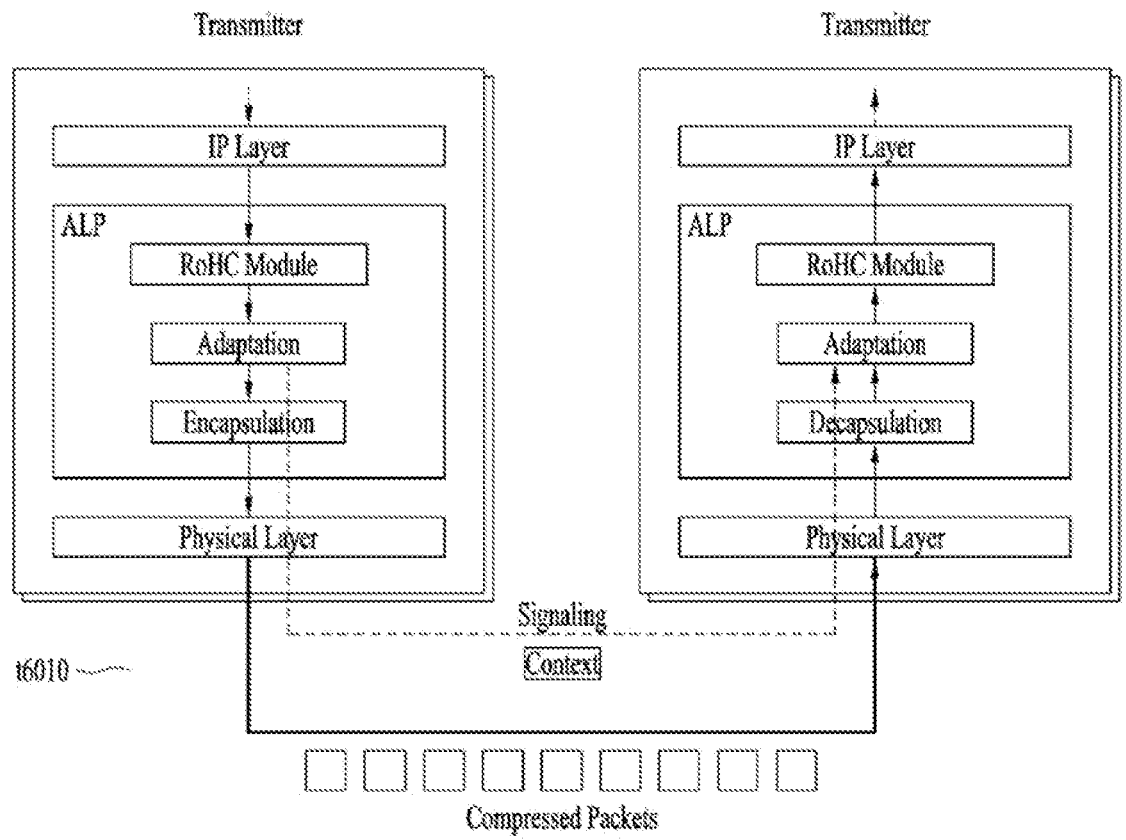
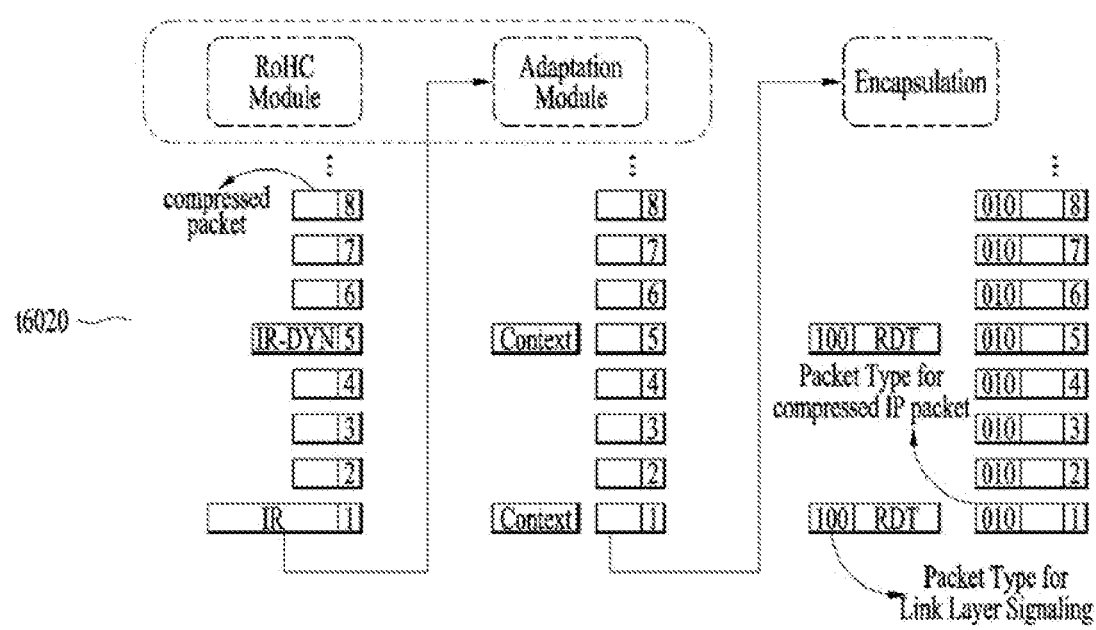

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | '11' |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if(SID_flag == "1") { | | |
|             SID | 8 | uimsbf |
|         } | | |
|         if(compressed_flag == "1") { | | |
|             context_id | 8 | uimsbf |
|         } | | |
|     } | | |
| } | | |

| Type of Content ID | Attributes | |
|---|---|---|
| | schemeIdUri | value |
| EIDR | tag:atsc.org,2016:3.0:cid:eidr | EIDR Content ID |
| Ad-ID | tag:atsc.org,2016:3.0:cid:adid | Ad-ID Content ID |

FIG. 14

| Syntax | #Bits | Mnemonic |
|---|---|---|
| content_id_descriptor { | | |
| descriptor_tag | 16 | uimsbf |
| descriptor_length | 8 | uimsbf |
| content_id_type_code | 4 | uimsbf |
| reserved | 4 | '1111' |
| identifier_length | 8 | uimsbf |
| identifier_value | variable | |
| } | | |

FIG. 15

| content_id_type_code | Content ID Type |
|---|---|
| 0 | EIDR |
| 1 | Ad-ID |
| 2-7 | Reserved for ATSC use |
| 8-15 | Reserved for private use |

FIG. 16

| Type of Content ID | Attributes | |
|---|---|---|
| | schemeIdUri | value |
| EIDR | urn:eidr | EIDR Content ID |
| Ad-ID | tag:atsc.org,2016:cid:adid | Ad-ID Content ID |
| User private content ID system | tag:atsc.org,2016:cid:x-<abbrev> | Content ID assigned in the private content ID system |

FIG. 17

| Syntax | #Bits | Mnemonic |
|---|---|---|
| content_id_descriptor { | | |
| descriptor_tag | 16 | uimsbf |
| descriptor_length | 8 | uimsbf |
| content_id_type_code | 4 | uimsbf |
| reserved | 4 | '1111' |
| content_identifier_length | 8 | uimsbf |
| content_identifier value | content_id_length*8 | |
| } | | |

FIG. 18

```
<element name="ContentInfo">
  <complexType>
    <choice>
      <element name="ReptnId" type="StringNoWhitespaceType" minOccurs="0" maxOccurs="1"/>
      <element name="AdapSetId" type="unsignedInt" minOccurs="0" maxOccurs="1"/>
      <element name="CapInfoId" type="string" minOccurs="0" maxOccurs="unbounded"/>
      <element name="AppId" type="string" minOccurs="0" maxOccurs="unbounded"/>
      <any namespace="##other" processContents="lax" minOccurs="0" maxOccurs="unbounded"/>
    </choice>
  </complexType>
</element>
<!-- String without white spaces -->
  <xs:simpleType name="StringNoWhitespaceType">
    <xs:restriction base="xs:string">
      <xs:pattern value="[^\r\n\t \p{Z}]*"/>
    </xs:restriction>
  </xs:simpleType>
```

FIG. 19

| Element or Attribute Name | | | Use | Data Type |
|---|---|---|---|---|
| SrcFlow | | | | srcFlowType |
| | @rt | | 0..1 | boolean |
| | @minBuffSize | | 0..1 | unsignedInt |
| | EFDT | | 0..1 | |
| | ContentInfo | | 0..1 | |
| | | ReptnId | 0..1 | StringNoWhitespaceType (String without white spaces) |
| | | AdapSetId | 0..1 | unsignedInt |
| | | CapInfoId | 0..N | string |
| | | AppId | 0..N | string |
| | Payload | | 1..N | |
| | | @codePoint | 0..1 | unsignedByte |
| | | @formatID | 1 | unsignedByte |
| | | @frag | 0..1 | unsignedByte |
| | | @order | 0..1 | unsignedByte |
| | | @srcFecPayloadID | 0..1 | unsignedByte |
| | FECParams | | 0..1 | |

Legend:

Note that the conditions only hold without using xlink:href. If linking is used, then all attributes are "optional" and <minOccurs=0>

Elements are bold; attributes are non-bold and preceded with an @.

FIG. 20A

```
<element name="ContentInfo">
  <complexType>
    <sequence>
      <element name="Reptn" type="ReptnType"/>
      <element name="EaResource" type="EaResourceType" />
      <element name="App" type="AppType" />
      <any namespace="##other" processContents="lax" minOccurs="0" maxOccurs="unbounded"/>
    </sequence>
  </complexType>
</element>
<!-- Representation Content -->
<xs:complexType name="ReptnType">
  <xs:sequence>
    <xs:any namespace="##other" processContents="lax" minOccurs="0" maxOccurs="unbounded"/>
  </xs:sequence>
<xs:attribute name="repId" type="StringNoWhitespaceType" use="required"/>
<xs:attribute name="startup" type="xs:boolean"/>
<xs:attribute name="lang" type="xs:language"/>
<xs:attribute name="contentType" type="contentTypeType"/>
<xs:anyAttribute namespace="##other" processContents="lax"/>
</xs:complexType>
<!-- String without white spaces -->
  <xs:simpleType name="StringNoWhitespaceType">
    <xs:restriction base="xs:string">
      <xs:pattern value="[^\r\n\t \p{Z}]*"/>
    </xs:restriction>
  </xs:simpleType>
<!-- Application Content -->
<xs:complexType name="AppType">
  <xs:sequence>
    <xs:element name="appUrl" type="xs:anyURI" minOccurs="0" maxOccurs="unbounded"/>
    <xs:any namespace="##other" processContents="lax" minOccurs="0" maxOccurs="unbounded"/>
  </xs:sequence>
  <xs:anyAttribute namespace="##other" processContents="lax"/>
</xs:complexType>
```

FIG. 20B

```xml
<!-- EA Resouce Content -->
<xs:complexType name="EaResourceType">
  <xs:sequence>
    <xs:element name="capInfoId" type="xs:string" minOccurs="0" maxOccurs="unbounded"/>
    <xs:any namespace="##other" processContents="lax" minOccurs="0" maxOccurs="unbounded"/>
  </xs:sequence>
  <xs:anyAttribute namespace="##other" processContents="lax"/>
</xs:complexType>
<!-- String without white spaces -->
<xs:simpleType name="StringNoWhitespaceType">
    <xs:restriction base="xs:string">
        <xs:enumeration value="emergency"/>
    </xs:restriction>
</xs:simpleType>
<!-- Content Type enumeration -->
<xs:simpleType name="contentTypeType">
    <xs:restriction base="xs:string">
        <xs:enumeration value="audio"/>
        <xs:enumeration value="video"/>
        <xs:enumeration value="subtitles"/>
          <xs:enumeration value="emergency"/>
    </xs:restriction>
</xs:simpleType>
<!-- Descriptor -->
<xs:complexType name="DescriptorType">
    <xs:sequence>
      <xs:any namespace="##other" processContents="lax" minOccurs="0" maxOccurs="unbounded"/>
    </xs:sequence>
    <xs:attribute name="schemeIdUri" type="xs:anyURI" use="required"/>
    <xs:attribute name="value" type="xs:string"/>
    <xs:attribute name="id" type="xs:string"/>
    <xs:anyAttribute namespace="##other" processContents="lax"/>
</xs:complexType>
</xs:schema>
```

FIG. 21

| Element or Attribute Name | | | | | Use | Data Type |
|---|---|---|---|---|---|---|
| SrcFlow | | | | | | srcFlowType |
| | @rt | | | | 0..1 | boolean |
| | @minBuffSize | | | | 0..1 | unsignedInt |
| | EFDT | | | | 0..1 | |
| | ContentInfo | | | | 0..1 | |
| | | Reptn | | | 0..N | |
| | | | @startUp | | 0..1 | Boolean |
| | | | @lang | | 0..1 | Language |
| | | | @contentType | | 0..1 | contentType |
| | | | repId | | 1 | StringNoWhitespace |
| | | EaResource | | | 0..N | |
| | | | AeaId | | 1 | string |
| | | App | | | 0..N | |
| | | | appUrl | | 1 | anyURI |
| | Payload | | | | 1..N | |
| | | @codePoint | | | 0..1 | unsignedByte |
| | | @formatID | | | 1 | unsignedByte |
| | | @frag | | | 0..1 | unsignedByte |
| | | @order | | | 0..1 | unsignedByte |
| | | @srcFecPayloadID | | | 0..1 | unsignedByte |
| | FECParams | | | | 0..1 | |

Legend:

Note that the conditions only hold without using xlink:href.
If linking is used, then all attributes are "optional"
and <minOccurs=0>

Elements are bold; attributes are non-bold and preceded with an @.

APPARATUS AND METHOD FOR TRANSMITTING AND RECEIVING BROADCAST SIGNAL

CROSS-REFERENCE TO RELATED APPLICATIONS

This Application is a Continuation of U.S. patent application Ser. No. 16/725,066 filed on Dec. 23, 2019 (now U.S. Pat. No. 10,944,492 issued on Mar. 9, 2021), which is a Continuation of U.S. patent application Ser. No. 16/070,226 filed on Jul. 13, 2018 (now U.S. Pat. No. 10,594,417 issued on Mar. 17, 2020), which is the National Phase of PCT International Application No. PCT/KR2017/000466 filed on Jan. 13, 2017, which claims the priority benefit under 35 U.S.C. § 119(e) to U.S. Provisional Application Nos. 62/339,038 filed on May 19, 2016, 62/302,187 filed on Mar. 2, 2016, 62/287,939 filed on Jan. 28, 2016 and 62/278,960 filed on Jan. 14, 2016, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal, a method for transmitting a broadcast signal, and a method for receiving a broadcast signal.

Discussion of the Related Art

Along with cessation of analog broadcasting, various technologies for transmitting and receiving a digital broadcast signal are being developed. A digital broadcast signal may carry a larger amount of video or audio data than an analog broadcast signal and may further include various types of additional data as well as video or audio data.

SUMMARY OF THE INVENTION

A digital broadcast system may provide High Definition (HD) images, multi-channel audio, and various additional services. However, to operate digital broadcasting, network flexibility needs to be improved in consideration of data transfer efficiency for transmission of a large amount of data, robustness of a transmission and reception network, and mobile reception devices.

To solve the technical problem above, the present invention proposes a method for transmitting a broadcast signal and an apparatus for transmitting a broadcast signal.

A method for transmitting a broadcast signal according to one embodiment of the present invention comprises generating service layer signaling (SLS) information comprising information for discovery and acquisition of broadcast service data; encoding the broadcast service data and the SLS information based on a delivery protocol; generating service list table (SLT) information comprising bootstrap information for acquiring the SLS information; User Datagram Protocol (UDP)/Internet Protocol (IP) encapsulating the broadcast service data, the SLS information, and the SLT information; and generating a signal frame by physical layer processing the broadcast service data, the SLS information, and the SLT information, wherein the delivery protocol is a Real-Time Object Delivery over Unidirectional Transport (ROUTE) protocol or an MPEG Media Transport (MMT) protocol.

An apparatus for transmitting a broadcast signal according to one embodiment of the present invention comprises a signaling generator configured to generate service layer signaling (SLS) information and service list table (SLT) information for broadcast service data, where the SLS information comprises information for discovery and acquisition of broadcast service data, and the SLT information comprises bootstrap information for acquisition of the SLS information; a delivery layer encoder configured to encode the broadcast service data and the SLS information based on a delivery protocol; a UDP/IP encapsulator configured to encapsulate User Datagram Protocol (UDP)/Internet Protocol (IP) on the broadcast service data, the SLS information, and the SLT information, respectively; and a physical layer processor configured to generate a signal frame by physical layer processing the broadcast service data, the SLS information, and the SLT information and to generate a signal frame, wherein the delivery protocol is a Real-Time Object Delivery over Unidirectional Transport (ROUTE) protocol or an MPEG Media Transport (MMT) protocol.

According to an embodiment of the present invention, when the broadcast service data is data for a broadcast service encoded based on the ROUTE protocol, the SLS information comprises a Service-based Transport Session Instance Description (S-TSID) fragment, wherein the S-TSID fragment comprises an RS element comprising information on a ROUTE session to which a content component of the broadcast service is delivered and an LS element comprising information on an LCT channel to which a content component of the broadcast service is delivered, and the LS element comprises a source flow element comprising information about a source flow.

According to an embodiment of the present invention, the source flow element comprises a ContentInfo element for providing information for the content component carried in the LCT channel, wherein the ContentInfo element comprises at least one of a first element comprising information about a DASH representation delivered in the LCT channel or a second element comprising information about an AEA message associated with an EA related resource delivered in the LCT channel.

According to an embodiment of the present invention, the first element comprises representation ID information indicating representation ID of the DASH representation.

According to an embodiment of the present invention, the first element further comprises language information indicating a language of the DASH representation and type information indicating a type of the DASH representation.

According to an embodiment of the present invention, the second element comprises AEA ID information indicating an ID of the AEA message.

According to an embodiment of the present invention, the SLS information further comprises a Media Presentation Description (MPD) fragment, wherein the MPD fragment comprises content ID information for identifying a content of a broadcast service, and the type of the content ID information comprises at least one of an EIDR type using an EIDR ID registered in the EIDR registry as a content ID, an Ad-ID type using an Ad-ID registered in an Ad-ID system as a content ID, or a user private ID type using an ID registered in a user's private system as a content ID.

Advantageous Effects

The present invention processes data according to the characteristics of a service and controls Quality of Service (QoS) for each service or service component, thereby providing various broadcast services.

The present invention transmits various broadcast services through the same Radio Frequency (RF) signal band, thereby achieving transmission flexibility.

The present invention is capable of providing a method and an apparatus for transmitting and receiving a broadcast signal by which a digital broadcast signal may be received without an error even with a mobile reception device or in an indoor environment.

The present invention effectively supports future broadcast services in an environment supporting future hybrid broadcast systems employing a terrestrial broadcast network and Internet network.

In what follows, additional effects brought by the present invention will be described together with a structure of the present invention.

BRIEF DESCRIPTION OF THE DRAWING

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through NWT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 9 illustrates a write operation of a time interleaver according to an embodiment of the present invention.

FIG. 13 illustrates content ID information according to one embodiment of the present invention.

FIG. 14 illustrates content ID information according to another embodiment of the present invention.

FIG. 15 illustrates content ID types and parameters according to one embodiment of the present invention.

FIG. 16 illustrates content ID information according to another embodiment of the present invention.

FIG. 17 illustrates content ID information according to a yet another embodiment of the present invention.

FIG. 18 illustrates a data structure of a ContentInfo element according to one embodiment of the present invention.

FIG. 19 illustrates a source flow element according to one embodiment of the present invention.

FIGS. 20A and 20B illustrate a data structure of a ContentInfo element according to another embodiment of the present invention.

FIG. 21 illustrates a source flow element according to another embodiment of the present invention.

DETAILED DESCRIPTION OF THE EMBODIMENTS

In what follows, preferred embodiments of the present invention are described in detail with reference to appended drawings. Detailed descriptions with reference to appended drawings are not necessarily limited only to the embodiments which may be implemented according to the present invention but rather intended to describe preferred embodiments of the present invention. The following descriptions given below include specific details for a thorough understanding of the present invention. However, it should be clearly understood by those skilled in the art that the present invention may be implemented without involving the specific details.

Most of the terms used in the present invention have been chosen among those terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

Figure 1:
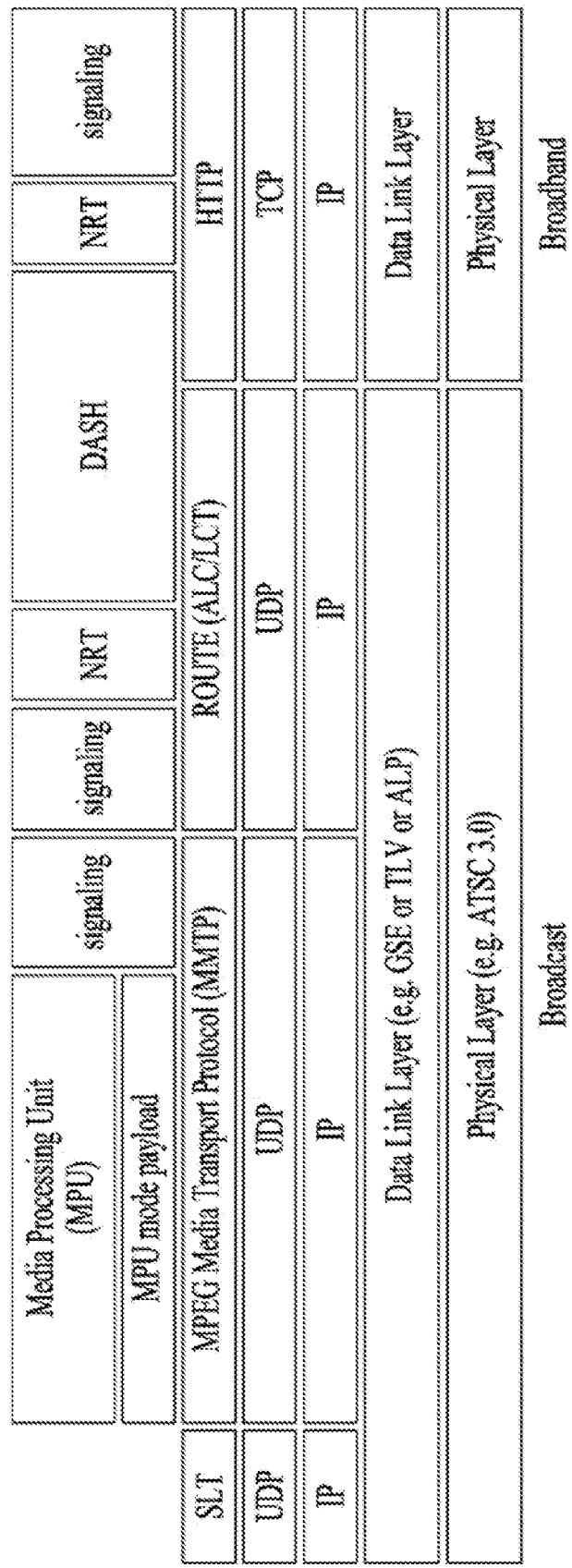
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data, may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
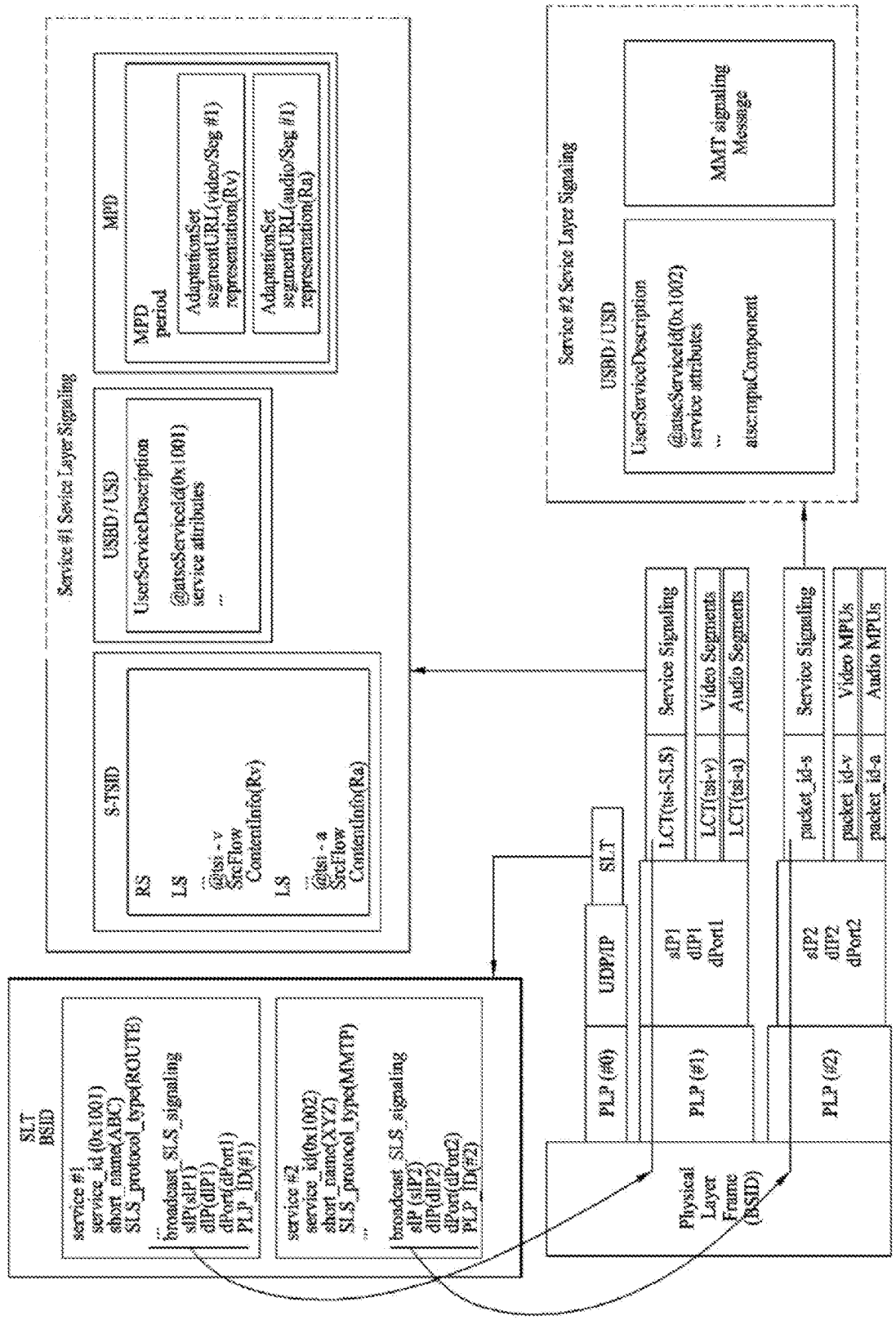
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD))/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @attribute, an @AmajorChannelNo attribute, an @minorChannelNo attribute, an @serviceCategory attribute, an @shortServiceName, attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media, components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the timber of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a the content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
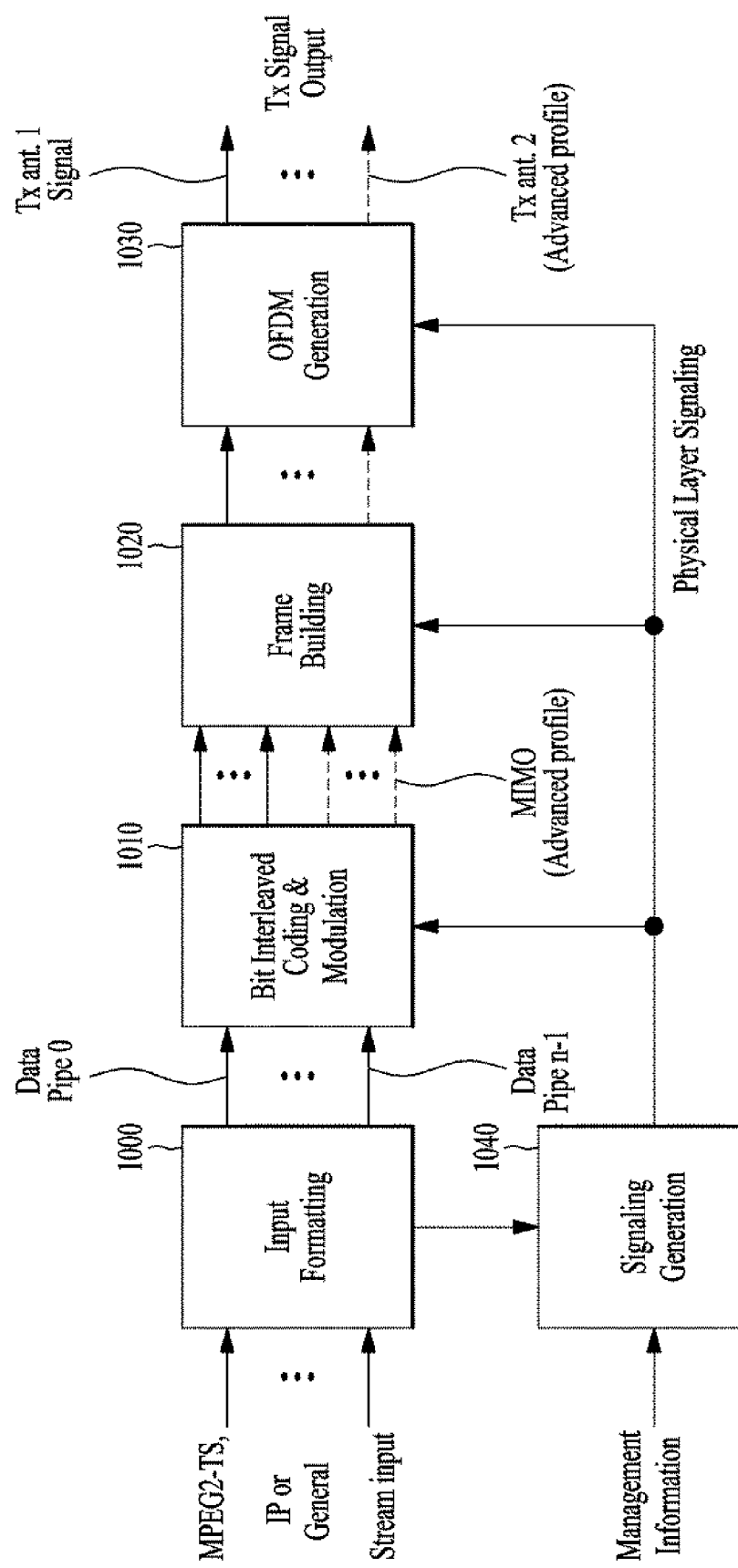
FIG. 8 illustrates a configuration of a broadcast signal transmission apparatus for future broadcast services according to an embodiment of the present invention.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block.

The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP.

The time interleaver according to an embodiment of the present invention can be positioned between a BICM chain block and a frame builder. Here, the time interleaver according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BO is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output ($g_{1,i}$ and $g_{2,i}$) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS1 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC_flag information. FIC (fast information channel) is a dedicated channel tier carrying cross-layer information to enable fast service acquisition and channel scanning. FIC_FLAG is a 1-bit field and indicates whether the FIC is used in a current frame. If this field is set to '1', the FTC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

According to an embodiment of the present invention, each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving at a receiver side.

Figure 9:
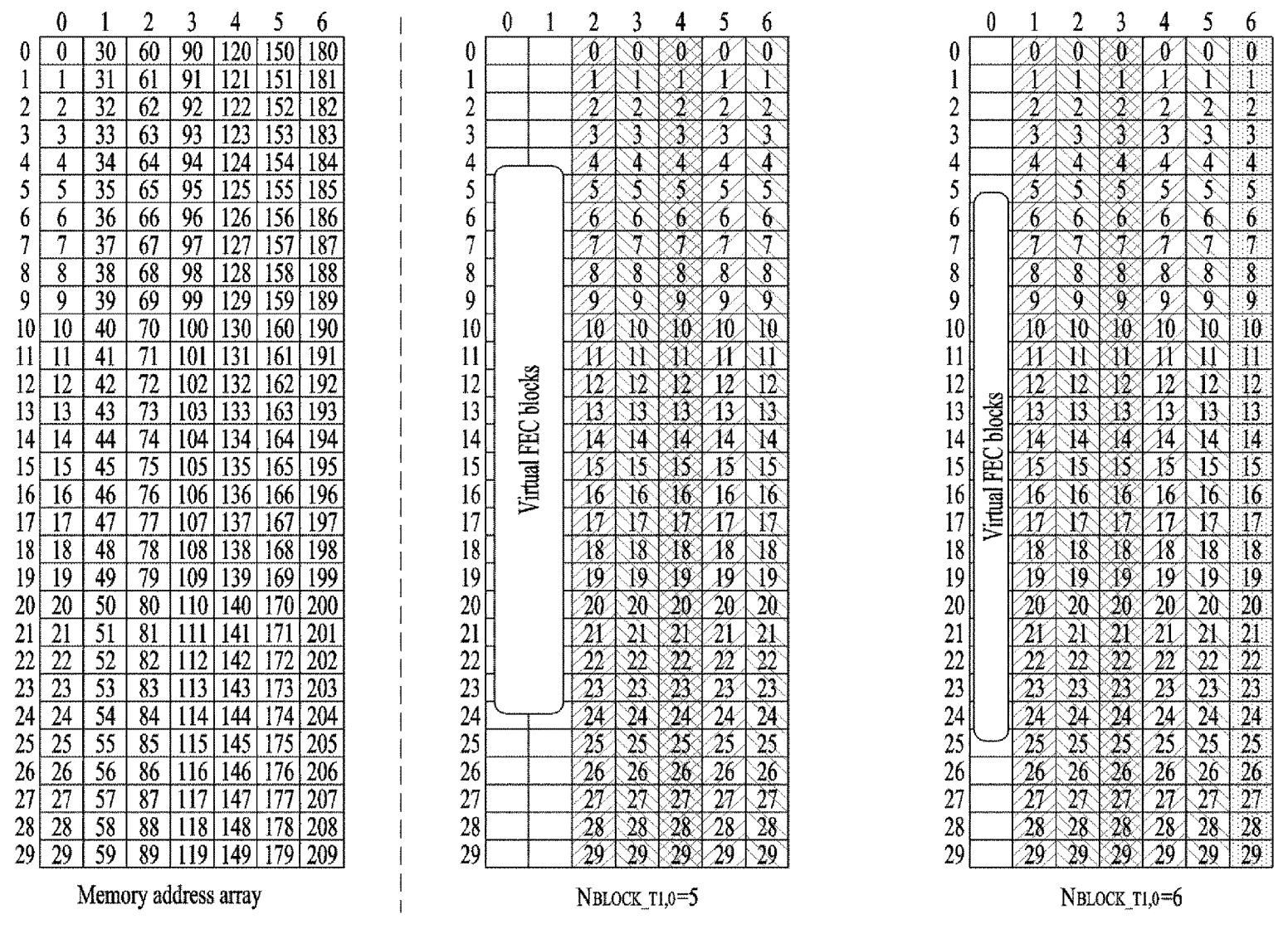

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

Figure 10:
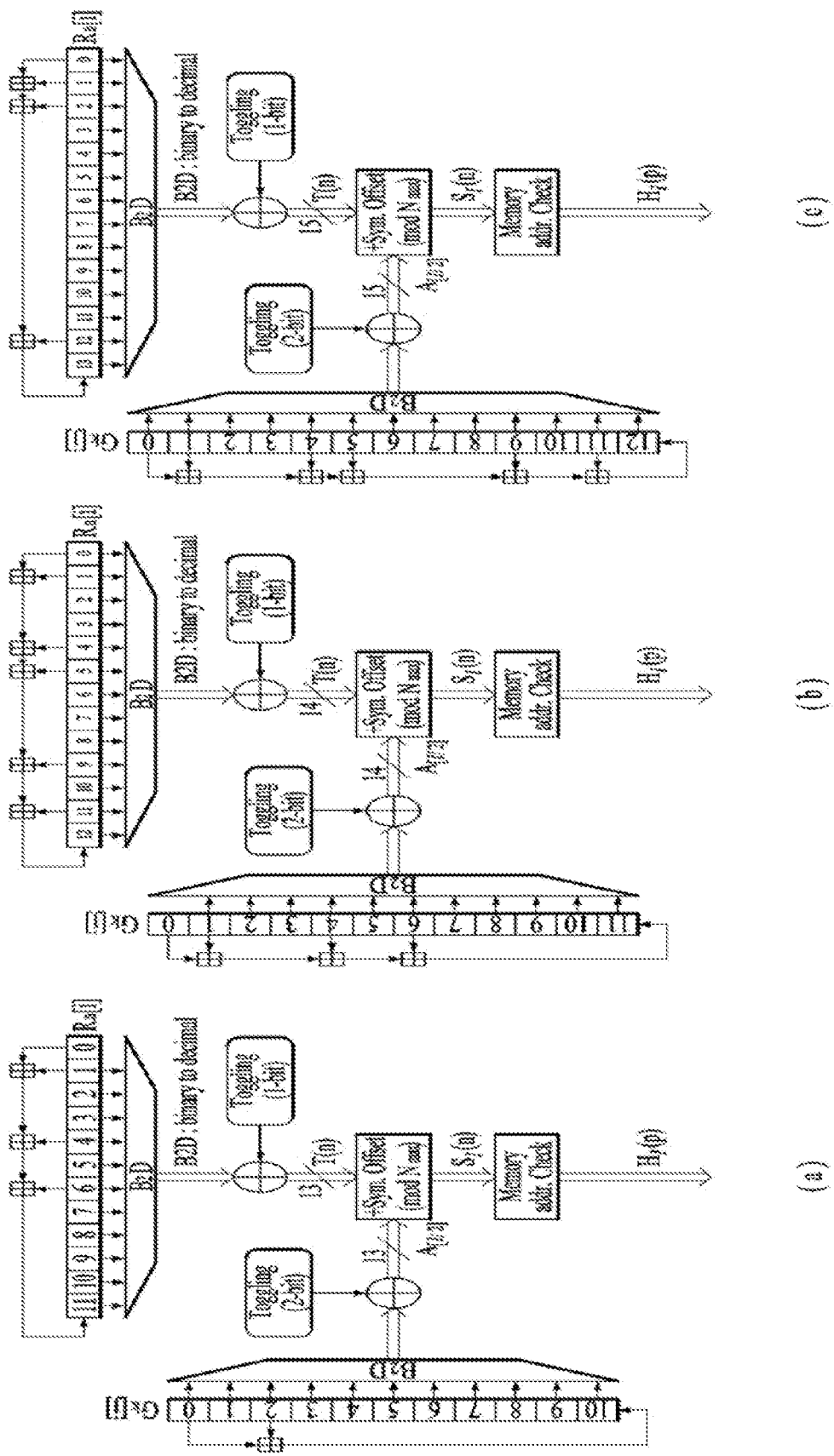
FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=\{x_{m,l,0}, \ldots, x_{m,l,p}, \ldots, x_{m,l,Ndata-1}\}$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=\{v_{m,l,0}, \ldots, v_{m,l,Ndata-1}\}$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Figure 11:
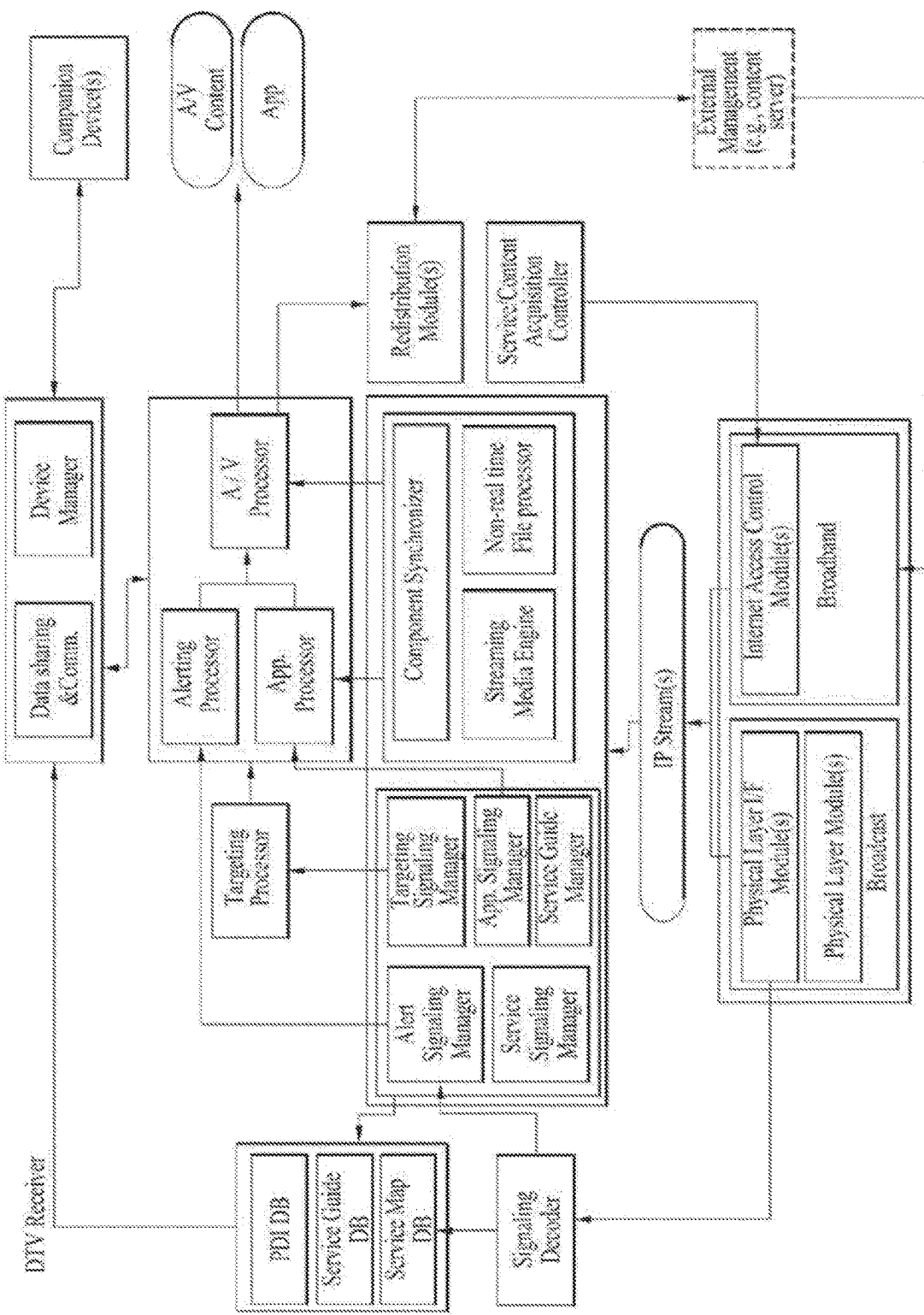
FIG. 11 illustrates a hybrid broadcast signal reception apparatus according to one embodiment of the present invention.

FIG. 11 illustrates a hybrid broadcast signal reception apparatus according to one embodiment of the present invention.

A hybrid broadcast system may transmit a broadcast signal in conjunction with a terrestrial broadcast network and an Internet network. A hybrid broadcast signal reception apparatus may receive a broadcast signal through the terrestrial broadcast network (broadcast) and the Internet network (broadband). A hybrid broadcast signal reception apparatus may include a physical layer module, physical layer I/F module, service/content acquisition controller, Internet access control module, signaling decoder, service signaling manager, service guide manager, application signaling manager, alert signal manager, alert signal parser, targeting signal parser, streaming media engine, non-real time file processor, component synchronizer, targeting processor, application processor, A/V processor, device manager, data sharing and communication unit, redistribution module, companion device and/or external modules.

The physical layer module(s) may receive and process a broadcast-related signal through a terrestrial broadcast channel, convert the broadcasting-related signal into an appropriate form, and deliver the converted signal into the physical layer I/F module.

The physical layer I/F module(s) may obtain IP datagrams from the information acquired from the physical layer module. Also, the physical layer I/F module may convert the obtained IP datagram into a specific frame (for example, RS frame or GSE).

The service/content acquisition controller may perform a control operation for acquiring services and contents through a broadcast and/or broadband channel and signaling data related to the services and contents.

The Internet access control module(s) may control the operation of a receiver for acquiring services and contents through a broadband channel.

The signaling decoder may decode signaling information acquired through a broadcast channel.

The service signaling manager may extract, parse, and manage a service scan and signaling information related to services and contents from an IP datagram.

The service guide manager may extract announcement information from an IP datagram, manages a Service Guide (SG) database, and provide a service guide.

The application (App) signaling manager may extract, parse, and manage signaling information related to acquisition of applications from an IP datagram.

The alert signaling parser may extract, parse, and manage alerting-related signaling information from an IP datagram.

The targeting signaling parser may extract, parse, and manage service/contents personalization or targeting-related signaling information from an IP datagram. Also, the targeting signal parser may deliver parsed signaling information to the targeting processor.

The streaming media engine may extract and decode audio/video data for A/V streaming from an IP datagram.

The non-real time file processor may extract, decode, and mange NRT data and file-type data such as an application from an IP datagram.

The component synchronizer may synchronize contents, such as streaming audio/video data and NRT data, and services.

The targeting processor may process computation related to personalization of services/contents on the basis of targeting signaling data received from the targeting signaling parser.

The application (App) processor may process application-related information, downloaded application states, and display parameters.

The A/V processor may perform an audio/video rendering-related operation on the basis of decoded audio and video data and application data.

The device manager may perform connection to an external device and a data exchange operation. Also, the device manger may perform management operations for external devices, including addition/removal/update of external devices that may be linked.

The data sharing and communication unit may process information related to data transfer and exchange between a hybrid broadcast receiver and an external device. Here, transferrable and exchangeable data may include signaling and A/V data.

The redistribution modules(s) may acquire information related to future broadcast services and contents when a broadcast receiver fails to receive a terrestrial broadcast signal directly. Also, the redistribution module may support acquisition of broadcast services and contents by a future broadcast system when a broadcast receiver fails to receive a terrestrial broadcast signal directly.

The companion device(s), being connected to a broadcast receiver of the present invention, may share audio, video, or signaling data. The companion device may refer to an external device connected to a broadcast receiver.

The external module may refer to a module for providing broadcast services/contents, for example, a future broadcast service/contents server. The external module may refer to an external device connected to a broadcast receiver.

Figure 12:
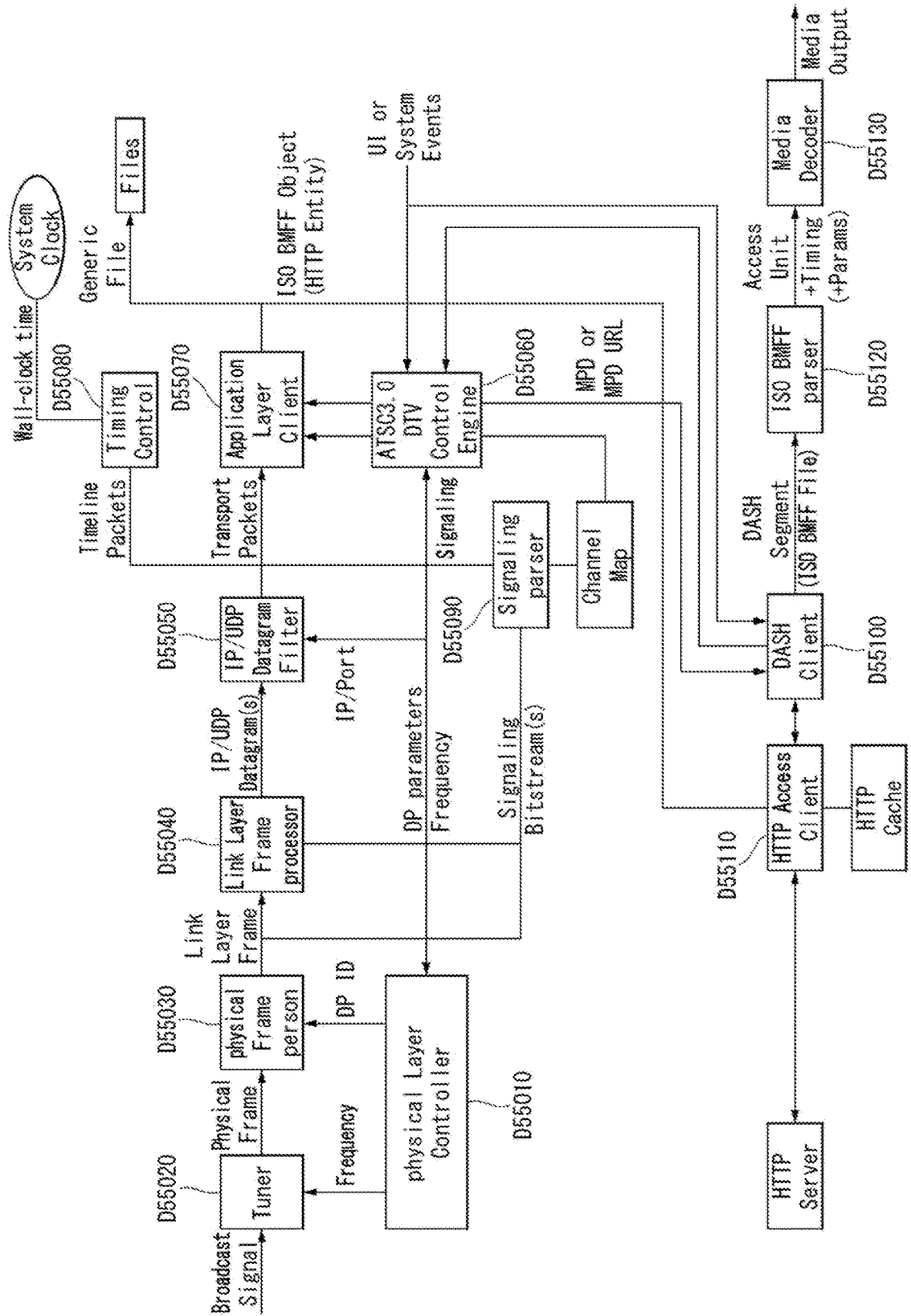
FIG. 12 illustrates a block diagram of a hybrid broadcast receiver according to one embodiment of the present invention.

FIG. 12 illustrates a block diagram of a hybrid broadcast receiver according to one embodiment of the present invention.

A hybrid broadcast receiver is capable of receiving a hybrid broadcast service through interoperation of terrestrial broadcasting and broadband from a DTV service of a future broadcast system. A hybrid broadcast receiver may receive broadcast audio/video (A/V) contents transmitted through terrestrial broadcasting and receive enhancement data related to the broadcast A/V contents or part of the broadcast A/V contents through broadband. In this document, the A/V contents may be referred to as media contents.

The hybrid broadcast receiver may include a physical layer controller D55010, tuner D44020, physical frame parser D55030, link layer frame parser D55040, IP/UDP datagram filter D55050, ATSC 3.0 DTV control engine D55060, application layer transport client D55070, timing control D55080, signaling parser D55090, Dynamic Adaptive Streaming over HTTP (DASH) client D55100, HTTP access client D55110, ISO Base Media File Format (BMFF) parser D55120 and/or media decoder D55130.

The physical layer controller D55010 may control the operation of the tuner D55020 and physical frame parser D55030 by using the Radio Frequency (RF) information of a terrestrial broadcast channel that the hybrid broadcast receiver attempts to receive.

The tuner D55020 may receive and process a broadcast-related signal through a terrestrial broadcast channel and convert the processed signal into an appropriate form. For example, the tuner D55020 may convert the received terrestrial broadcast signal into a physical frame.

The physical frame parser D55030 may parse received physical frames and acquire link layer frames through processing related to the parsing.

The link layer parser D55040 may acquire link layer signaling from the link layer frame or perform computation related to acquisition of an IP/UDP datagram. The link layer parser D55040 may output at least one IP/UDP datagram.

The IP/UDP datagram filter D55050 may filter a specific IP/UDP datagram from at least one received IP/UDP datagram. In other words, the IP/UDP datagram filter D55050 may filter the IP/UDP datagram selected by the ATSC 3.0

DTV control engine D55060 selectively from among at least one IP/UDP datagram output from the link layer parser D55040. The IP/DUP datagram filter D55050 may output application layer transport protocol packets such as ALC/LCT+, FLUTE, and ROUTE.

The ATSC 3.0 DTV control engine D55060 may deal with an interface between modules included in each hybrid broadcast receiver. Also, the ATSC 3.0 DTV control engine D55060 may deliver parameters required for each module to the corresponding module and control the operation thereof. In the present invention, the ATSC 3.0 DTV control engine D55060 may deliver Media Presentation Description (MPD) and/or MPD URL to the DASH client D55100. Also, the ATSC 3.0 DTV control engine D55060 of the present invention may deliver a delivery mode and/or a Transport Session Identifier (TSI) to the application layer transport client D55070. Here, the TSI may be used to indicate a session which transmits a transport packet including a signaling message such as MPD or MPD URL-related signaling, for example, an ALC/LCT+ session based on the application layer transport protocol, FLUTE session, or ROUTE session. Also, the transport session identifier may correspond to the Asset ID of the MMT.

The application layer transport client D55070 may process an application layer transport protocol packet. (for example, a transport protocol packet which supports real-time object transmission, such as ROUTE packet and MMT packet), collect and process a plurality of packets, and generate one or more ISO Base Media File Format (ISOBMFF) objects. The application layer transport protocol packet may include ALC/LCT packet, ALC/LCT+ packet, FLUTE packet, ROUTE packet and/or MMTP packet.

The timing control D55080 may process the packet including system time information and control the system clock according to the processed result.

The signaling parser D55090 may acquire and parse signaling related to a DTV broadcast service and generate and manage a channel map on the basis of the parsed signaling. In the present invention, the signaling parser may parse the MPD expanded from signaling information or MPD-related information.

The DASH client D55100 may perform computations related to real-time streaming or adaptive streaming. The DASH client D55100 may receive DASH contents from an HTTP server through an HTTP access client D55110. The DASH client D55100 may process received DASH segments and output ISO BMFF objects. In the present invention, the DASH client D55100 may deliver a fully qualified representation ID or a segment URL to the ATSC 3.0 DTV control engine D55060. Here, the fully qualified representation ID may refer to the ID which is a combination of an MPD URL, period@id, and representation@id. Also, the DASH client D55100 may receive the MPD or MPD URL from the ATSC 3.0 DTV control engine D55060. The DASH client D55100 may receive a desired media stream or a DASH segment from an HTTP server by using the MPD or MPD URL received, in this document, the DASH client D55100 may be called a processor.

The HTTP access client D55100 may request specific information from the HTTP server, receive a response from the HTTP server, and process the response. Here, the HTTP server may process a request received from the HTTP access client and provide a response with respect to the request.

The ISO BMFF parser D55120 may extract audio/video data from the ISO BMFF object.

The media decoder D55130 may decode received audio and/or video data and perform processing for presentation of the decoded audio/video data.

In what follows, content identifier information (content ID information) for the contents of a broadcast service according to one embodiment of the present invention will be described. In the present document, the content ID refers to an identifier for distinguishing contents such as the contents provided through broadcasting (broadcast contents) or contents provided through broadband (broadband contents).

The content ID information may be used for the purpose of the following example. For example, a program or contents played by the user in a broadcast signal reception apparatus may be tracked by usage reporting. In this case, the content ID information may be used for the tracking. In other words, the broadcast signal reception apparatus may use the content ID information for usage reporting of the contents played by the user.

In another example, there are times when a broadcast network is temporarily blocked while a broadcast signal reception apparatus is receiving contents (for example, advertisement contents) through the broadcast network, and the broadcast signal reception apparatus is unable to receive the corresponding contents through the broadcast network. In this case, the broadcast signal reception apparatus may use the content ID information for downloading the corresponding contents through broadband.

The content ID information may be signaled in various ways depending on the type of a broadcast service. For example, if a broadcast service is a ROUTE/DASH service, the broadcast signal transmission apparatus may provide (or signal) content ID information about contents by using the MPD. Here, the ROUTE/DASH service refers to a broadcast service delivered according to the ROUTE protocol, which will be described in more detail with reference to FIGS. 13 and 16.

In a yet another example, if a broadcast service is an MMT service, a broadcast signal transmission apparatus may provide (or signal) content ID information about contents by using a content ID descriptor. Here, the MMT service refers to a broadcast service delivered according to the MMT protocol, which will be described in more detail with reference to FIGS. 14, 15, and 17.

FIG. 13 illustrates content ID information according to one embodiment of the present invention. The content ID information in the embodiment of FIG. 13 is a first embodiment of content ID information for the contents of a ROUTE/DASH service.

In the embodiment of FIG. 13, a broadcast service may be a ROUTE/DASH service employing the ROUTE/DASH for delivering contents (for example, broadcast streaming contents). In this case, it may be required that streaming contents within the corresponding service are made to be linked to content ID information. At this time, an element having the attributes shown in FIG. 13 may be added to the Period element within the MPD of the corresponding service. In the embodiment, to annotate contents, an asset identifier descriptor at the level of the Period element within the MPD may be used. In this document, the asset identifier descriptor may be referred to as asset identifier information and asset identifier element.

For example, when streaming contents within a service employing the ROUTE/DASH for the delivery of broadcast streaming contents are required to be linked to content ID information, an AssetIdentifier element having the attributes of FIG. 13 may be added to an appropriate Period element within the DASH MPD for the corresponding service. In the embodiment, the AssetIdentifier element may include schemeIDURI (@schemeIdUri) attribute and/or value (@value) attribute.

Referring to FIG. 11, content ID information may have one or more types. For example, the type of content ID information may include EIDR type and/or Ad-ID type.

EIDR identifies content ID information per entry of the EIDR registry (http://eidr.org). Ad-ID identifies content ID information per entry of the Ad-ID registry (http://ad-id.org).

In an embodiment, when the content ID type is EIDR type, the value of @schemeIdUri attribute of the AssetIdentifier element may be set by an EIDR-related designator (for example, "tag:atsc.org,2016:3.0:cid:eidr"), and the value of @value attribute may be set by EIDR content ID information. The EDIR content ID information, as a valid canonical EDIR entry, may be the same string as the canonical form of the EIDR ID registered in "the Entertainment Identifier Registry".

In an embodiment, when the content ID type is Ad-ID type, the value of @schemeIdUri attribute of the AssetIdentifier element (or descriptor) may be set by an Ad-ID related designator, and the value of @value attribute may be set by Ad-ID content ID information. In an embodiment, the Ad-ID related designator may be set by a designator for "full" or "compact" encoding (for example, "tag:atsc.org,2016:3.0:cid:adid"). Also, the Ad-ID content ID information, as a valid Ad-ID entry, may be the same string as the Ad-ID code registered in the Ad-ID system developed by "the American Association of Advertising Agencies and the Association of National Advertisers".

Depending on the embodiments, the type of content ID information may further include user-defined content ID information. In this case, by using the unique value of the @schemeIdUri attribute properly, a different type of content ID information, which includes a user private type, may be used. For example, a novel, experimental or proprietary content ID type may be used by replacing the "eidr" or "adid" within the @schemeIdUri attribute with designation for a new content ID type in the form of "x-<abbrev>". Here, <abbrev> may represent appropriate abbreviation for a new type. In this case, care should be taken so that the used <abbrev> should not be duplicated for part of other experimental or proprietary content ID information within the same broadcast system. In this document, the user-defined content ID information may be referred to as user private content ID information.

Also, single ID information may be supported for each content; depending on an embodiment, however, multiple cases of content ID information may also be supported for the same content. Also, signaling for static content ID information related to contents (for example, a list of content ID information related to scheduled contents) and dynamic content ID information (for example, content IDs related to unscheduled, dynamically inserted advertisements) may be taken into consideration.

FIG. 14 illustrates content ID information according to another embodiment of the present invention. The content ID information in the embodiment of FIG. 14 is a first embodiment of content ID information for the contents of an MMT service.

In the embodiment of FIG. 14, a broadcast service may be a service employing the MMT for delivering contents (for example, broadcast streaming contents). In this case, it may be required that streaming contents within the corresponding service are made to be linked to content ID information. At this time, the content ID information descriptor of FIG. 12 may be included in the descriptor loop of the table-label of the MMT Package (MP) table for the corresponding service.

For example, when streaming contents within a service employing the MMT for the delivery of broadcast streaming contents are required to be linked to content ID information, the content ID information descriptor (content_id_descriptor) of FIG. 12 and semantic definition for the content ID information descriptor may be included in the descriptor loop of the table-label of the MP table (MPT) for the corresponding service.

In what follows, each field of the content ID information descriptor in the embodiment of FIG. 14 will be described. The content ID information descriptor of the present invention may be called content ID information.

Referring to FIG. 14, the content ID information descriptor may have one or more fields (or information). For example, the content ID information descriptor may include a descriptor tag (descriptor_tag) field, descriptor length (descriptor_length) field, content ID type code (content_id_type_code) field, reserved field, ID length (identifier_length) field and/or ID value (identifier value) field. In this document, the ID length field may be referred to as a content ID length field, and the ID value field may be referred to as a content ID value field. Each field (or information) will be described below.

Descriptor tag (descriptor_tag) field: Descriptor tag field represents a tag value indicating the type of a descriptor. In an embodiment, the descriptor tag field may have a size of 16 bits.

Descriptor length (descriptor_length) field: Descriptor length field represents the length of a descriptor in units of bytes, which counts from the next byte after this field to the last byte of the descriptor. In an embodiment, the descriptor length field may have a size of 8 bits.

Content ID type code (content_id_type_code) field: For example, this field indicates the type of content ID information as shown in FIG. 13. In an embodiment, the content ID type code field may have a size of four bits.

Reserved field: A field reserved for future use. In an embodiment, the reserved field may have a size of four bits.

ID length (identifier_length) field: This field indicates the length of the ID value field in units of bytes. In an embodiment, the ID length field may have a size of 8 bits.

ID value (identifier value) field: This field provides the value of content ID information. In an embodiment, the size of the ID value field is variable.

FIG. 15 illustrates content ID types and parameters according to one embodiment of the present invention. In particular, the embodiment of FIG. 15 shows content ID types according to the values of the content ID type codes of FIG. 14.

Referring to FIG. 15, if the content ID type code has a first value (for example, 0), the content ID type code indicates that the content ID type is the EIDR type. Also, if the content ID type code has a second value (for example, 1), the content ID type code indicates that the content ID type is the Ad-ID type. Also, if the content ID type code has a third value (for example, a value between 2 and 7), the content ID type code indicates that the content ID type is reserved for ATSC use. Also, if the content ID type code has a fourth value (for example, a value between 8 and 15), the content ID type code indicates that the content ID type is reserved for private use.

In the embodiment, if the content ID type is the EIDR type, for example, the content ID type code has the first value, the ID value field may be the same string (for example, a 16-character string) as the canonical form of the EIDR ID registered in "the Entertainment Identifier Registry" (http://eidr.org).

In the embodiment, if the content ID type is the Ad-Id type, for example, if the content ID type code has the second value, the ID value field may be the same string (for example, a 11-character or 12-character string) as the Ad-ID code registered in the Ad-ID system developed by "the American Association of Advertising Agencies and the Association of National Advertisers".

In the embodiment, if the content ID type is the user private type, for example, if the content ID type code has the third value, the II) value field may have the content ID value registered in the user private content ID information system.

FIG. 16 illustrates content ID information according to another embodiment of the present invention. The content ID information in the embodiment of FIG. 16 illustrates a second embodiment of the content ID information for the contents of a ROUTE/DASH service. In the embodiment of FIG. 16, the same descriptions as in the embodiment of FIG. 13 will be omitted.

In the embodiment of FIG. 16, when linear contents (or streaming contents) within a service employing the ROUTE/DASH (for example, an ATSC 3.0 service) for the delivery of broadcast linear streaming contents (or broadcast streaming contents) are required to be linked to content ID information, an AssetIdentifier element having the attributes of FIG. 16 may be added to the DASH MPD Period element of the corresponding service for an arbitrary period to which the content ID information is applied. In an embodiment, the AssetIdentifier element may include @schemeIdUri attribute and/or @value attribute.

Referring to FIG. 16, the content ID information may have one or more types. For example, the type of content ID information may include EIDR type, Ad-ID type and/or user private content ID information system type. In other words, the type of content ID information may further include the user private content ID information system type.

In an embodiment, when the content ID type is EIDR type, the value of @schemeIdUri attribute of the AssetIdentifier element (or descriptor) may be set by an EIDR-related designator (for example, "urn:eidr"), and the value of @value attribute may be set by EIDR content ID information. As described above, the EDIR content ID information, as a valid canonical EDIR entry, may be the same string as the canonical form of the EIDR ID registered in "the Entertainment Identifier Registry".

In an embodiment, when the content ID type is Ad-ID type, the value of @schemeIdUri attribute of the AssetIdentifier element (or descriptor) may be set by an Ad-ID related designator (for example, "tag:atsc.org,2016:cid:adid"), and the value of @value attribute may be set by Ad-ID content ID information. The Ad-ID content ID information, as a valid Ad-ID entry, may be the same string as the Ad-ID code registered in the Ad-ID system developed by "the American Association of Advertising Agencies and the Association of National Advertisers".

In an embodiment, when the content ID type is user private content ID information system type, the value of @schemeIdUri attribute of the Assetidentifier element (or descriptor) may be set by a user private content-related designator (for example, "tag:atsc.org,2016: cid:x-<abbrev>"), and the value of @value attribute may be set by user private content ID information. The user private content ID information, as content ID information allocated to a private content ID information system, may have the value of a House Number, ISCs, and so on.

As described above, an experimental or proprietary content ID information system may be supported by replacing the "eidr" or "adid" within @schemeIdUri attribute with "x-<abbrev>" which is a designation form for the content ID information system. Here, <abbrev> may represent appropriate abbreviation for the content ID information system. In this case, care should be taken so that the used <abbrev> should not be duplicated for part of other experimental or proprietary content ID information within the same broadcast system.

FIG. 17 illustrates content ID information according to a yet another embodiment of the present invention. The content ID information of FIG. 17 illustrates a second embodiment of the content ID information for the contents of an MMT service. In the embodiment of FIG. 17, the same descriptions as in the embodiment of FIG. 14 will be omitted.

In the embodiment of FIG. 17, when linear contents (or streaming contents) within a service employing the MMT for the delivery of broadcast linear streaming contents (or broadcast streaming contents) are required to be linked to content ID information, the content ID information descriptor (content_id_descriptor) of FIG. 17 and semantic definition for the content ID information descriptor may be included in the descriptor loop of the table-label of the MPT for the corresponding service.

In what follows, each field of the content ID formation descriptor in the embodiment of FIG. 17 will be described.

Referring to FIG. 17, the content ID information descriptor may have one or more fields (or information). For example, the content ID information descriptor may include a descriptor tag (descriptor_tag) field, descriptor length (descriptor_length) field, content ID type code (content_id_type_code) field, reserved field, content ID length (content_identifier_length) field and/or content ID value (identifier value) field.

Definitions for the descriptor tag field, descriptor length field, content ID type code field, reserved field, content ID length field, and content ID value field are the same as the definitions for the descriptor tag field, descriptor length field, content ID type code field, reserved field, ID length field, and ID value field of FIG. 14; therefore, the same descriptions will be omitted.

In the embodiment of FIG. 17, the content ID value field may be eight times the size of the content ID length field.

Also, the content ID type code in the embodiment of FIG. 17 and the information about the content ID type according to the code value may use the values as shown in the table of FIG. 15.

In what follows, the ContentInfo element for the contents (or content components) of a broadcast service according to one embodiment of the present invention will be described. In particular, a data structure of the ContentInfo element and child elements and their attributes according to one embodiment of the present invention will be described.

In this document, a ContentInfo element is an element within the S-TSID fragment of the ROUTE SLS and provides additional information which may be mapped to a service (or an application service) delivered in the corresponding transport session. In an embodiment, as shown in FIG. 4, the ContentInfo element may be a child element of the source flow (SrcFlow) element of the LCT element (or LS element) within the ROUTE element (or RS element) within the S-TSID fragment of the ROUTE SLS. The ContentInfo element may be used for signaling what is carried through the LCT channel (for example, content components or contents). In other words, the ContentInfo element may provide information about what is delivered through the LCT channel within a ROUTE session.

In an embodiment, the LCT channel may include DASH presentation or an adaptation set for streaming contents. In other words, the LCT channel may carry DASH resources. Or the LCT channel may include resources of one or more Emergency Alert (EA)-related elements (for example, CAP info element). Or the LCT channel may include a downloaded app and/or content items required by the downloaded app. Or the LCT channel may include other items which have not been defined yet.

In a broadcast system according to one embodiment, different types of components (or content components) may be transmitted for each LCT channel within a ROUTE session. In this case, a broadcast signal reception apparatus may check which component is transmitted through each LCT channel by using the ContentInfo element and from the checking result, may acquire only a desired component from the corresponding LCT channel.

In other words, when a broadcast signal transmission apparatus signals the ContentInfo element, the broadcast signal reception apparatus may perform a filtering function for obtaining only a desired component by using the ContentInfo element. Through this operation, the broadcast signal reception apparatus becomes able to receive only the desired content components instead of receiving all of the content components available and thereby prevents waste of bandwidth due to reception of unnecessary components and waste of memory due to storing the unnecessary components.

In this document, the ContentInfo element may be referred to as ContentInfo information or ContentInfo field.

FIG. 18 illustrates a data structure of a ContentInfo element according to one embodiment of the present invention. In the embodiment of FIG. 18, the ContentInfo element may be expressed by an XML schema.

Referring to FIG. 18, a ContentInfo element according to one embodiment is a root element and may be defined as a complex type, not a string type. In an embodiment, the ContentInfo element may use a choice compositor and may be defined to include any one of a representation ID (ReptnId) element, CapInfoId element, and AppID element.

FIG. 19 illustrates a source flow element according to one embodiment of the present invention. In particular, FIG. 19 illustrates child elements of a source flow (SrcFlow) element according to one embodiment of the present invention and their attributes. In the embodiment of FIG. 19, each field of a source flow element may be omitted or a plurality of the field may exist depending on its value in the Use column shown.

As described above, a source flow element may describe the source flow of the ROUTE. In an embodiment, a source flow element may represent a source flow carried in the LCT channel. A ContentInfo element belonging to the source flow in the embodiment of FIG. 19 may have the same data structure as that of the ContentInfo element in the embodiment of FIG. 18.

In what follows, first, the source protocol of the ROUTE is briefly descried and then a SrcFlow element which describes a source flow established by the source protocol is described.

The source protocol is a core component of the ROUTE. The source protocol of the ROUTE may be used for transmitting a delivery object through a unidirectional channel. The source protocol may establish at least one or more source flows within one ROUTE session. These source flows may deliver related objects in the form of object flows. Each object may be reconstructed individually.

Referring to FIG. 19, the source flow element may include @rt attribute, @minBuffSize attribute, EFDE element, ContentInfo element and/or payload element. In what follows, each attribute and element will be described.

The @rt attribute may indicate whether a source flow element carries streaming media (or real-time streaming media). The @rt attribute may exist when the source flow element carries streaming media and may be set to "true". In the opposite case, the @rt attribute may be set to "false". The default value may be "false".

The @minBuffSize attribute may define the minimum number of kilobytes required for a receiver transmission buffer for the LCT channel. If @rt attribute exists, the @minBuffSize attribute may be set to "true". Also, the EFDT element may indicate an extended FDT instance.

The ContentInfo element may provide contents information included in the LCT channel of the corresponding source flow element. In other words, the ContentInfo element may provide information about contents included in the parent LCT channel which include the corresponding source flow element. In an embodiment, the ContentInfo element may include a DASH content representation or adaptation set for a streaming service. Or the ContentInfo element may include a resource of an EA-related element (for example, CAP info element) for the EAS service. Or the ContentInfo element may include a downloaded app and/or content items required by the downloaded app.

In an embodiment, the ContentInfo element may include a representation ID (ReptnId) element, adaptation set ID (AdapSetId) element, CapInfo ID (CapInfold) element and/ or App (AppID) element.

The ReptnId element may indicate the representation ID of DASH media representation when the LCT channel within a ROUTE session in the S-TSID includes DASH representation.

The AdapSetId element may indicate the adaptation set ID of DASH contents when the LCT channel in a ROUTE session in the S-TSID includes a DASH adaptation set.

The CapInfold element may indicate the ID of an EA-related element (for example, CAP info element or AEA message) when the LCT channel in a ROUTE session in the S-TSDI includes rich media contents for an EAS service.

The AppID element may indicate the ID of a downloaded app and/or content item required by the app when the LCT channel in a ROUTE session within the S-TSDI includes an item for playing a service.

The payload element may provide information for payload of ROUTE packets which carry objects of a source flow. In an embodiment, the payload element may include @codePoint attribute, @formatID attribute, @frag attribute, @order attribute and/or @srcFecPayloadID attribute.

The @codePoint attribute shows numerical representation of a combination of specific values with respect to child elements of the payload element and their attributes. The value of the @codePoint attribute may be the same as that of the Codepoint (CP) field within the LCT header. The default value may be "0".

The @formatID attribute may specify the payload format of a delivery object.

The @frag attribute may include an unsigned byte value which indicates how the payload of a ROUTE packet carrying objects of a source flow is fragmented for the delivery of the objects. The default value may be 0. In what follows, description about each value of the @frag attribute is given.

0: Arbitrary. If the value of @frag attribute is 0, the attribute of @frag may indicate that the payload of the corresponding ROUTE packet carries a contiguous portion of a delivery object in which fragmentation occurs at an arbitrary byte boundary.

1: Application specific (sample-based). If the value of @frag attribute is 1, the attribute of @frag may indicate that the payload of the corresponding ROUTE packet carries media data in the form of one or more complete samples. Here, the term "sample" may be defined in the ISO/IEC 14496-12 standard. Its use includes the MDE mode, and thereby a packet may strictly carry an MDE data box including samples stored in a 'mdat' box.

2: Application specific (collection of boxes). If the value of @frag attribute is 2, the attribute of @frag may indicate that the payload of the corresponding ROUTE packet includes the entire data of one or more boxes. Here, the term "box" may be defined in the ISO/IEC 14496-12 standard, by which a pseudo packet may carry a portion of an MDE data block starting as a Random Access Point (RAP) and strictly carry boxes including metadata (for example, styp, sidx, moof, and (child) boxes including them).

3-127: Reserved for a future use.

128-255: Reserved for a proprietary use.

The @order attribute may include an unsigned byte value which indicates how the payload of a ROUTE packet carrying objects of a source flow, as DASH segments, is delivered in the order of generation by the DASH encoder. The default value may be 0. In what follows, description about each value of the @order attribute is given.

0: Arbitrary. If the value of @order attribute is 0, the attribute of @order may indicate that the corresponding packet carries a portion of a DASH segment the order of which is arbitrary (non-specific) with respect to other portions of the same DASH segment carried by other packets.

1: In-order delivery. If the value of @order attribute is 0, the attribute of @order may indicate that concatenation of payload of neighboring packets which carry DASH segments is the same as the segment generated by the DASH encoder.

2: Delivery in the order of media samples and delivery in the order before movie fragment box. If the value of @order attribute is 2, the attribute of @order may indicate that concatenation of payload of neighboring packets carrying media samples of a movie fragment is in the same order of the samples as if they were generated by the DASH encoder. Here, a movie fragment may be defined in the ISO/IEC 23009-I standard. However, these packets have to be transmitted before the movie fragment box, namely, packets) carrying moof. The usage when the @order attribute is 2 may be confined to the MDE mode.

3-127: Reserved for a future use.

128-255: Reserved for a proprietary use.

The @srcFecPayloadID attribute may represent values defined for the source FEC payload ID. These values may deliver the following rules.

0: If the value of @srcFecPayloadID attribute is 0, the attribute of the @srcFecPayloadID may indicate that the source FEC payload ID is not defined, and the entire delivery objects are included in the corresponding packet. In this case, there should be no FEC parameter (FECParams) element which is a child element of the source flow element.

1: If the value of @srcFecPayloadID attribute is 0, the attribute of the @srcFecPayloadID may indicate that the source FEC payload ID has a 32-bit unsigned integer value representing the start offset within an object. In this case, there should be no FECParams element which is a child element of the source flow element.

2: If the value of @srcFecPayloadID attribute is 2, the attribute of the @srcFecPayloadID may indicate that the FECParams element, which is a child element of the source flow element, defines the format of the source FEC payload ID.

In an embodiment, the source flow element may further include the FECParams element as a child element. The FECParams element may define a parameter based on the FEC scheme related to the source flow in the form of FEC object transport information. FEC parameters may be applied to source FEC payload IDs specific to the ROUTE (ALC) packet header.

FIG. 20 illustrates a data structure of a ContentInfo element according to another embodiment of the present invention. In the embodiment of FIG. 20, the ContentInfo element may be expressed by an XML schema. In FIG. 20, the same descriptions as in FIG. 18 will be omitted.

Referring to FIG. 20A, the ContentInfo element according to one embodiment is a root element and may be defined as a complex type, not a string type. In an embodiment, the ContentInfo element may use a sequence compositor and may be defined to include a sequence of a representation ID (ReptnId) element, LA resource (EaResource) element, and App element.

Also, the data structure of the embodiment of FIG. 20 may include a definition of "StringNoWhitespaceType".

Also, in the embodiment of FIG. 20, the representation element may be defined as a complex type. In an embodiment, the representation element may include a sequence of a representation ID (repId) attribute, startup attribute, language (lang) attribute, and content type (contentType) attribute.

Referring to FIG. 20B, as an embodiment, the content type element may have contentTypeType as a type value. In this case, the contentTypeType is an attribute value and may have an audio, video, caption and/or emergency value. In other words, the contentTypeType may further have the emergency value as its attribute value.

FIG. 21 illustrates a source flow element according to another embodiment of the present invention. In particular, FIG. 21 illustrates child elements of the source flow (SrcFlow) element according to another embodiment of the present invention and their attributes. In FIG. 21, the same descriptions as in FIG. 19 will be omitted. The ContentInfo element included in the source flow element of the embodiment of FIG. 21 may have a data structure of the ContentInfo element of the embodiment of FIG. 20, for example. In the embodiment of FIG. 21, each field of a source flow element may be omitted or a plurality of the field may exist depending on its value in the Use column shown.

Referring to FIG. 21, the source flow element may include @rt attribute, @minBuffSize attribute, EFDT element, ContentInfo element and/or payload element. Also, the source flow element may further include an FECParams element. In what follows, each attribute and element will be described.

Since the definition of the source flow element of FIG. 21 is the same as that given for the source flow element of FIG. 19, detailed descriptions thereof will be omitted. Also, since definitions for the @rt attribute, @minBuffSize attribute, EFDE element, ContentInfo element, payload element, and FECParams element of FIG. 21 are the same as the definitions for the @rt attribute, @minBuffSize attribute, EFDE element, ContentInfo element, payload element, and FECParams element of FIG. 21, detailed descriptions thereof will be omitted.

Referring to FIG. 21, the ContentInfo element may include a representation (Reptn) element. EA resource (EAResource) element and/or App element. In this document, the Reptn element may be referred to as a media info (MediaInfo) element.

The ReptnId element may represent the DASH representation. In an embodiment, the ReptnId element may include information about DASH representation delivered in the LCT channel. For example, the Reptn element may include a startup (@startUp) attribute, language (@lang) attribute, content type (@contentType) attribute and/or representation ID (repId) element.

The @startUp attribute may be used to identify which representation has to be used for "MPD-less" startup, which is a default setting for a complex service having additional representation. In other words, the @startUp attribute may be the value (for example, a Boolean flag) used to assist the "MPD-less" operation. In an embodiment, the @startUp attribute may be a flag indicating whether a DASH resource carried in the corresponding LCT channel may be delivered to a media rendering application for decoding and rendering. By using the @startup attribute, since a receiver does not require reception of an MPD to start playing of a service, a quick start may be supported at the time of channel change.

In an embodiment, if the @startUp attribute has a first value (for example, true or 1), the @startUp attribute may indicate that MPD-less start and playing of media contents delivered by the corresponding source flow are allowed. Or, if the @startUp attribute has a second value (for example, false or 0), the @startUp attribute may indicate that MPD-less start is not allowed.

The @lang attribute may indicate the language of representation. The @lang attribute may represent the audio language of a DASH resource delivered by the corresponding LCT channel.

The @contentType attribute may represent the type of representation. In an embodiment, the representation type may have one of the following four types:
audio,
video,
subtitles, and
emergency audio.

The repId element (or attribute) may represent a representation ID of DASH representation delivered in the corresponding LCT channel. This attribute may be informed to a ROUTE client by a DASH player when the DASH player selects representation for the purpose of presentation, after which the ROUTE client may extract the representation instead of extracting the whole representation.

In other words, the value of this attribute may be delivered to a ROUTE client (or ROUTE receiver) by a DASH player when the DASH player selects representation(s) to be rendered. As a result, instead of downloading the whole representation available for a receiver (or a broadcast signal reception apparatus), the ROUTE client may download only the representation to which the DASH client has delivered the repID attribute. In other words, when the repID attribute is signaled, a broadcast signal reception apparatus may receive only the desired representation (or component) from filtering based on the repID attribute. By doing so, a broadcast signal reception apparatus prevents waste of bandwidth due to reception of unnecessary components and waste of memory due to storing the unnecessary components.

In an embodiment, the EaResource element may include AeaId element. The EaResource element may include information about an EA-related message (for example, an AEA message) associated with an EA-related resource (for example, an AEA media file or an EA-related rich media file) delivered in the LCT channel. In this document, the EaResource element my be referred to as an AEA media (AeaMedia) element.

The AreaId element may represent the ID of an Advanced Emergency Alert-Message Format (AEA-MF) message (or an AEA message) delivered in the corresponding LCT channel. In other words, the AeaId element may represent the ID of an AEA message.

In an embodiment, the AEA message may be an EA-related message associated with an AEA media file carried in the corresponding LCT channel. At this time, the referenced AEA media file (or multimedia resource) may be delivered from a parent LCT channel of the corresponding ContentInfo element. Here, the parent LCT channel refers to an LCT channel to which a source flow element belongs.

Therefore, a broadcast signal reception apparatus may receive a desired EA-related multimedia resource (or only a rich media resource) from the corresponding LCT channel by using the AeaId element. In other words, by using the AeaId element, the broadcast signal reception apparatus may receive only a desired AEA message or a rich media file associated with the desired AEA message instead of receiving all of the AEA messages available within an EA-related table (for example, an AEA table (AEAT)) or all of the rich media files associated with the AEA messages. By doing so, waste of resources due to reception and storing of unnecessary EA-related rich media resources may be prevented.

In an embodiment, the App element may include an appUrl element. The appUrl element may represent the URL of an application. In an embodiment, at any given time, at most one application may be activated.

In what follows, a method for transmitting a broadcast signal, an apparatus for transmitting a broadcast signal, a method for receiving a broadcast signal, and an apparatus for receiving a broadcast signal according to one embodiment of the present invention will be described. In this document, an apparatus for transmitting a broadcast signal may be referred to as a broadcast signal transmission apparatus, a broadcast transmitter, or a transmitter. Also, an apparatus for receiving a broadcast signal may be referred to as a broadcast signal reception apparatus, a broadcast receiver, or a receiver.

Figure 22:
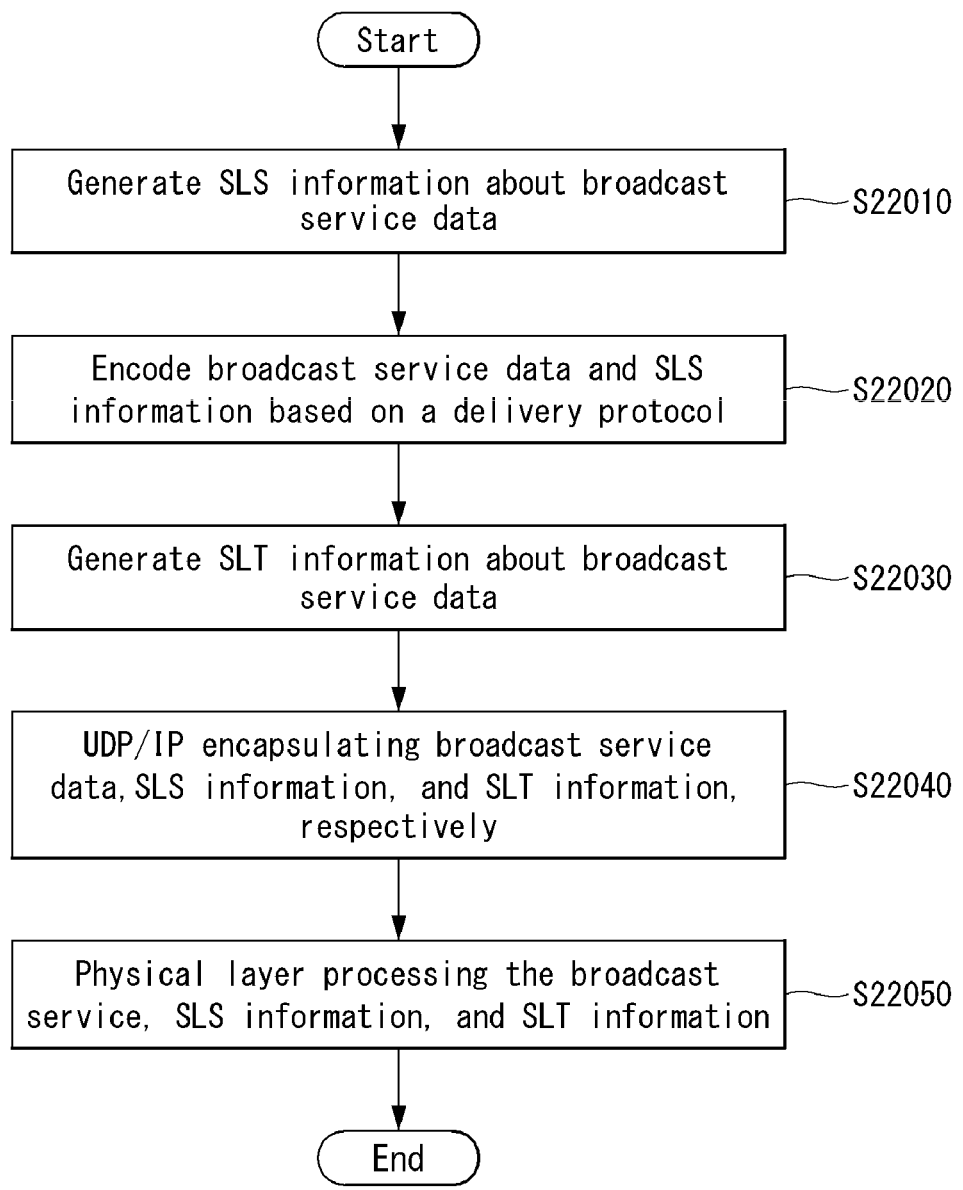
FIG. 22 illustrates a method for transmitting a broadcast signal according to an embodiment of the present invention.

FIG. 22 illustrates a method for transmitting a broadcast signal according to an embodiment of the present invention.

A broadcast transmitter may generate service layer signaling (SLS) information for broadcast service data S22010. Broadcast service data supports functions provided by a broadcast service and include at least one of audio, video, and text data. In an embodiment, broadcast service data may be the data for a broadcast service (ROUTE/DASH service or ROUTE service) encoded on the basis of the ROUTE protocol or the data for a broadcast service (MMT service) encoded on the basis of the MMT protocol. In an embodiment, broadcast service data may include one or more content components (or contents). In this document, a content component may be referred to as a service component.

In an embodiment, SLS information may be the signaling information including information for discovery and acquisition of broadcast service data. For example, SLS information is a signaling data transmitted at the level of a service layer, which may be the ROUTE SLS information for a ROUTE service or MMT SLS information for an MMT service.

The broadcast transmitter may encode broadcast service data and SLS information on the basis of a delivery protocol S22020. In an embodiment, the delivery protocol according to which broadcast service data and SLS information are encoded may be the Real-Time Object Delivery over Unidirectional Transport (ROUTE) protocol or MPEG Media Transport (MMT) protocol. Meanwhile, broadcast service data and SLS information may be encoded on the basis of the same delivery protocol. In other words, when broadcast service data are encoded according to the MMT protocol, the SLS information (MMT SLS information) about the corresponding broadcast service data may be encoded according to the MMT protocol. Also, when broadcast service data are encoded according to the ROUTE protocol, SLS information (ROUTE SLS information) about the corresponding broadcast service may be encoded according to the ROUTE protocol.

In an embodiment, if broadcast service data are the data for a broadcast service (ROUTE service) encoded on the basis of the ROUTE protocol, SLS information (ROUTE SLS) may include Service-based Transport Session Instance Description (S-TSID) fragments. In an embodiment, S-TSID fragments may include an RS element (or ROUTE element) including information about a ROUTE session through which content components of a broadcast service are delivered and an LS element (or LCT element) including information about the LCT channel through which content components of a broadcast service are delivered. Also, an LS element may include a source flow element including information about a source flow carried in the LCT channel. In an embodiment, an LS element may be included in an RS element.

In an embodiment, if a broadcast service includes a plurality of content components, each content component may be carried in a separate LCT channel. In other words, one LCT channel is able to carry only one type of content components (contents). In this case, an RS element may include a plurality of LS elements, and each LS element may provide information about one content component (or contents) carried in the corresponding LCT channel.

In this case, a broadcast signal reception apparatus may check which component is transmitted in each LCT channel by using the ContentInfo element and from the checking result, may obtain only desired components from the corresponding LCT channel. In other words, if a broadcast signal transmission apparatus signals the ContentInfo element, a broadcast signal reception apparatus may perform a filtering function for obtaining only desired components by using the ContentInfo element. In this way, the broadcast signal reception apparatus, instead of receiving all of the content components available, may receive only the desired content components, thereby preventing waste of bandwidth due to reception of unnecessary components and waste of memory due to storing the unnecessary components.

In an embodiment, a source flow element may include the ContentInfo element which provides information about content components carried in the LCT channel. In an embodiment, the ContentInfo element may include at least one of a first element including information about DASH representation delivered in the LCT channel or a second element including information about an AEA message associated with an EA-related resource delivered in the LCT channel.

In an embodiment, the first element may include representation ID information representing the representation ID of the DASH representation. Also, the first element may further include language information representing the language of the DASH representation and the type information representing the type of the DASH representation.

In an embodiment, the second element may include the AEA ID information representing the ID of an AEA message.

In an embodiment, the SLS information may further include Media Presentation Description (MPD) fragments. In an embodiment, an MPD fragment may include content ID information for identifying contents of a broadcast service. In an embodiment, the type of content ID information may include at least one of the EIDR type which uses the EIDR ID registered in the EIDR registry as a contents ID, Ad-ID type which uses the Ad-ID registered in the Ad-ID system as a contents ID, or user private ID type which uses the ID registered in the user private system as a contents ID.

The broadcast transmitter may generate service list table (SLT) information about broadcast service data S22030. In an embodiment, the SLT information is a signaling data transmitted at the level of the IP/UDP layer, which may be included in the aforementioned Low Level signaling (LLS) information (or table). In an embodiment, the SLT information may include bootstrap information for obtaining the SLS information.

The broadcast transmitter may perform User Datagram Protocol (UDP)/Internet Protocol (IP) encapsulation on broadcast service data, SLS information and SLT information, respectively S29040. The broadcast service data, SLS information, and SLT information, which are encapsulated according to the UDP/IP format, are IP packets which may be identified by an IP address and port number. Therefore, the data transmitted by the broadcast transmitter according to the present invention may be operated/identified on the basis of the IP.

In the UDP/IP encapsulation, the SLT information may be encapsulated by IP packets having predetermined addresses. In other words, the SLT information may be delivered via IP packets having predetermined addresses. For example, LLS information including the SLT information may be carried as a payload of an IP packet having a well-known address and port number.

The broadcast transmitter may generate a signal frame by performing physical layer processing on broadcast service data, SLS information, and SLT information S22050. Also, the broadcast transmitter may transmit a broadcast signal including a signal frame.

Also, the broadcast transmitter may further include a step of performing link layer processing on broadcast service data, SLS information, and SLT information between the IP/UDP encapsulating step S22040 and the physical layer processing step S22050. Since the link layer processing is the same as described above, repeated descriptions will be omitted.

In what follows, a method for receiving a broadcast signal according to an embodiment of the present invention will be described.

A broadcast receiver according to one embodiment of the present invention may receive a broadcast signal including broadcast service data and signaling information through a broadcast network. In an embodiment, signaling information may include at least one of service list table (SLT) information or service layer signaling (SLS) information.

A broadcast receiver according to one embodiment of the present invention may obtain broadcast service data on the basis of signaling information.

More specifically, a broadcast receiver may obtain SLT information and obtain SLS information on the basis of the SLT information. For example, the broadcast receiver may obtain ROUTE SLS information or MMT SLS information on the basis of the SLT information. Also, the broadcast receiver may obtain broadcast service data on the basis of the SLS information (for example, transmission path information).

In one embodiment, a broadcast receiver may obtain transmission path information of at least one component (or content component) transmitted through an MMTP session by using the MMT SLS information (for example, MMTP signaling message).

In another embodiment, a broadcast receiver may obtain transmission path information of at least one component (or content component) transmitted through a ROUTE session by using the ROUTE SLS information (for example, S-TSID).

In an embodiment, an S-TSID fragment may include an RS element (or an ROUTE element) including information about a ROUTE session to which a content component of a broadcast service is delivered and an LS element (or an LCT element) including information about an LCT channel to which a content component of a broadcast service is delivered. Also, an LS element may include a source flow element including information about a source flow carried in the LCT channel. In an embodiment, the LS element may be included in the RS element.

In an embodiment, if a broadcast service includes a plurality of content components, each content component may be carried in a separate LCT channel. In other words, one LCT channel is capable of carrying only one type of content component (contents). In this case, an RS element may include a plurality of LS elements, and each LS element may provide information about one content component (or contents) carried in the corresponding LCT channel.

In this case, a broadcast receiver may check which component is transmitted to each LCT channel by using the ContentInfo element and from the checking result, may obtain only desired components from the corresponding LCT channel. In other words, if a broadcast signal transmission apparatus signals the ContentInfo element, the broadcast receiver may perform a filtering function for obtaining only the desired components by using the ContentInfo element. In this way, instead of receiving all of the content components available, the broadcast receiver becomes able to receive only the desired components, thereby preventing waste of bandwidth due to reception of unnecessary components and waste of memory due to storing the unnecessary components.

In an embodiment, a source flow element may include the ContentInfo element which provides information about content components carried in the LCT channel. In an embodiment, the ContentInfo element may include at least one of a first element including information about DASH representation delivered in the LCT channel or a second element including information about an AEA message associated with an EA-related resource delivered in the LCT channel.

In an embodiment, the first element may include representation ID information representing the representation ID of the DASH representation. Also, the first element may further include language information representing the language of the DASH representation and the type information representing the type of the DASH representation.

In an embodiment, the second element may include the AEA ID information representing the ID of an AEA message.

In an embodiment, the SLS information may further include Media Presentation Description (MPD) fragments, and an MPD fragment may include content ID information for identifying contents of a broadcast service. In an embodiment, the type of content ID information may include at least one of the EIDR type which uses the EIDR ID registered in the EIDR registry as a contents ID, Ad-ID type which uses the Ad-ID registered in the Ad-ID system as a contents ID, or user private ID type which uses the ID registered in the user private system as a contents ID.

Figure 23:
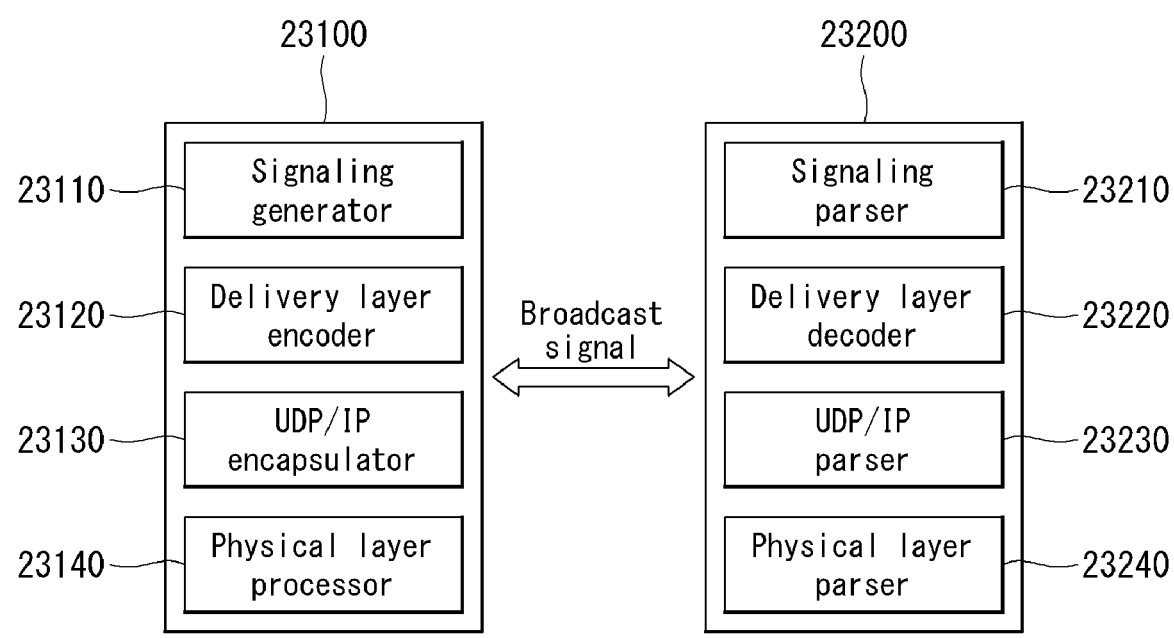
FIG. 23 illustrates a broadcast signal transmitter and a broadcast signal receiver according to an embodiment of the present invention.

FIG. 23 illustrates a broadcast signal transmitter and a broadcast signal receiver according to an embodiment of the present invention. In FIG. 23, those descriptions as already given with reference to FIG. 22 will be omitted. In this document, a broadcast signal transmitter may also be referred to as a broadcast transmitter, a broadcast signal transmission apparatus, or a broadcast transmission apparatus. Also, a broadcast signal receiver may also be referred to as a broadcast receiver, a broadcast signal reception apparatus, or a broadcast reception apparatus.

The broadcast signal transmitter 23100 may include a signaling generator 23110, delivery layer encoder 23120, UDP/IP encapsulator 23130, and physical layer processor 23140.

The signaling generator 23110 may generate SLS information and SLT information for broadcast service data. In an embodiment, SLS information may include information for discovery and acquisition of broadcast service data, and SLT information may include information used for discovery of the SES information and building a basic service list.

The delivery layer encoder 23120 may encode broadcast service data and SLS information on the basis of a delivery protocol. In an embodiment, the delivery protocol may be the Real-Time Object Delivery over Unidirectional Transport (ROUTE) protocol or MPEG Media Transport (MMT) protocol.

The UDP/IP encapsulator 23130 may encapsulate broadcast service data, SLS information, and SLT information according to the UDP/IP format.

The physical layer processor 23140 may generate a signal frame by performing physical layer processing on broadcast service data, SLS information, and SLT information.

The broadcast signal transmitter 23100 of FIG. 23 performs the method for transmitting a broadcast signal as described above; therefore, the same descriptions thereof are not given. Also, the broadcast signal transmitter 23100 may further include a link layer processor (not shown). The link layer processor may apply link layer processing to the broadcast service data, SLS information, and SLT information between the IP/UDP encapsulator 23130 and the physical layer processor 23140. Since the link layer processing has been already described above, the same descriptions thereof will be omitted.

The broadcast signal receiver 23200 may include a signaling parser 23210, delivery layer decoder 30220, UDP/IP packet parser 23230, and physical layer parser 23240. The broadcast signal receiver 23200 may perform the inverse operation of the broadcast signal transmitter.

The physical layer parser 23240 may apply physical layer processing to a received signal frame and output a UDP/IP packet stream. The UDP/IP packet parser 23230 may decapsulate a received IP packet stream and output service component data (or service components). The delivery layer decoder 23240 may decode service component data according to a delivery protocol. The signaling parser 23210 may obtain and parse signaling information to control the operation of the broadcast signal receiver. For example, the broadcast signal receiver may obtain SLT information, parse the SLT information, and obtain the IP address and port number of desired SLS information. And the broadcast signal receiver may parse the SLS information to obtain a transmission path of desired service data. And the broadcast signal receiver may apply physical layer parsing, UDP/IP decapsulating, and delivery layer decoding to the desired broadcast data over the whole path, thereby providing the corresponding broadcast service to the user.

Also, the broadcast signal receiver 23200 may further include a link layer parser (not shown). The link layer parser may perform link layer processing (parsing) between the physical layer parser 23240 and the IP/UDP packet parser 23230.

In FIG. 23, sub-units of the broadcast signal transmitter and the broadcast signal receiver have been distinguished according to their operation. In other words, one sub-unit does not necessarily have to be implemented as one physical processor, but one sub-unit may be implemented in the form of a plurality of physical processors or a plurality of sub-units may be implemented as one physical processor.

Each step described in the embodiments above may be performed by hardware/processors. Each module/block/unit described in the embodiments above may operate as hardware/processor. Also, methods proposed by the present invention may be executed in the form of program codes. These codes may be written in a processor-readable storage medium and therefore may be read out by a processor provided by an apparatus.

For the convenience of description, embodiments have been described with reference to the respective drawings; however, it is still possible to design so that embodiments illustrated by the respective drawings may be combined to implement a new embodiment. Apparatus and methods according to the present invention are not necessarily limited to the composition of embodiments described above and the methods used therefor, but all or part of the embodiments described above may be combined selectively so that various modifications may be made for the embodiments.

Meanwhile, the method according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

It should be clearly understood by those skilled in the art that the present invention may be changed or modified in various ways without departing from the technical principles and scope of the present invention. Therefore, it is intended that the present invention includes changes and modifications of the present invention defined by appended claims and provided within their equivalent scope.

The present document describes both of the apparatus and the method invention, and descriptions of the respective inventions may be applied in a supplementary manner.

Various embodiments have been described in their best mode for implementing the present invention.

The present invention is used for a series of broadcast signal transmission/reception applications.

It should be clearly understood by those skilled in the art that the present invention may be changed or modified in various ways without departing from the technical principles and scope of the present invention. Therefore, it is intended that the present invention includes changes and modifications of the present invention defined by appended claims and provided within their equivalent scope.

What is claimed is:

1. A method for delivering data in a digital transmitter, the method comprising:
    generating service layer signaling (SLS) information comprising information for discovery and acquisition of at least one component, wherein the at least one component relates to audio data or video data;
    generating service list table (SLT) information comprising bootstrap information for acquiring the SLS information; and
    transmitting a broadcast signal comprising the at least one component, the SLS information and the SLT information,
    wherein the SLS information comprises a Service-based Transport Session Instance Description (S-TSID) fragment,
    wherein the S-TSID fragment comprises a first element comprising information on a ROUTE session in which the at least one component is carried and a second element comprising information on at least one LCT channel that carries the at least one component, further the second element comprises a source flow element comprising information about a source flow,
    wherein the source flow element comprises a ContentInfo element for providing information for a content carried in at least one LCT channel, and
    wherein the ContentInfo element comprises an Advanced Emergency Alert (AEA) message ID for representing an identifier of at least one AEA message.

2. The method of claim 1, wherein the ContentInfo element comprises representation ID information indicating a representation ID of a DASH representation carried in at least one LCT channel.

3. The method of claim 2, wherein the ContentInfo element further comprises language information indicating a language of the DASH representation and type information indicating a type of the DASH representation.

4. The method of claim 3, wherein the SLS information further comprises a Media Presentation Description (MPD) fragment, and
    wherein the MPD fragment comprises content ID information for identifying the content of the at least one component, and the type of the content ID information comprises at least one of an EIDR type using an EIDR ID registered in the EIDR registry as a content ID, an Ad-ID type using an Ad-ID registered in Ad-ID system as a content ID, or a user private ID type using an ID registered in a user private system as a content ID.

5. A digital transmitter for delivering data, the digital transmitter comprising:
    a signaling generator configured to generate service layer signaling (SLS) information and service list table (SLT) information,
    wherein the SLS information comprises information for discovery and acquisition of at least one component, and the SLT information comprises bootstrap information for acquisition of the SLS information, wherein the at least one component relates to audio data or video data; and a physical layer processor configured to transmit a broadcast signal comprising the at least one component, the SLS information, and the SLT information, wherein the SLS information comprises a Service-based Transport Session Instance Description (S-TSID) fragment, wherein the S-TSID fragment comprises a first element comprising information on a ROUTE session in which the at least one component is carried and a second element comprising information on at least one LCT channel that carries the at least one component, further the second element comprises a source flow element comprising information about a source flow, wherein the source flow element comprises a ContentInfo element for providing information for a content carried in at least one LCT channel, and wherein the ContentInfo element comprises an Advanced Emergency Alert (AEA) message ID for representing an identifier of at least one AEA message.

6. The digital transmitter of claim 5, wherein the ContentInfo element comprises representation ID information indicating a representation ID of a DASH representation carried in at least one LCT channel.

7. The digital transmitter of claim 6, wherein the ContentInfo element further comprises language information indicating a language of the DASH representation and type information indicating a type of the DASH representation.

8. The digital transmitter of claim 7, wherein the SLS information further comprises a Media Presentation Description (MPD) fragment, and wherein the MPD fragment comprises content ID information for identifying the content of the at least one component, and the type of the content ID information comprises at least one of an EIDR type using an EIDR ID registered in the EIDR registry as a content ID, an Ad-ID type using an Ad-ID registered in Ad-ID system as a content ID, or a user private ID type using an ID registered in a user private system as a content ID.

9. A method for receiving data in a digital receiver, the method comprising:

receiving a broadcast signal comprising at least one component, SLS (service layer signaling) information and SLT (service list table) information, wherein the SLS information comprises information for discovery and acquisition of the at least one component, wherein the at least one component relates to audio data or video data;

wherein the SLT information comprises bootstrap information for acquiring the SLS information, wherein the SLS information comprises a Service-based Transport Session Instance Description (S-TSID) fragment, wherein the S-TSID fragment comprises a first element comprising information on a ROUTE session in which the at least one component is carried and a second element comprising information on at least one LCT channel that carries the at least one component, further the second element comprises a source flow element comprising information about a source flow, wherein the source flow element comprises a ContentInfo element for providing information for a content carried in at least one LCT channel, and wherein the ContentInfo element comprises an Advanced Emergency Alert (AEA) message ID for representing an identifier of at least one AEA message; and processing the broadcast signal.

10. The method of claim 9, wherein the ContentInfo element comprises representation ID information indicating a representation ID of a DASH representation carried in at least one LCT channel.

11. The method of claim 10, wherein the ContentInfo element further comprises language information indicating a language of the DASH representation and type information indicating a type of the DASH representation.

12. The method of claim 11, wherein the SLS information further comprises a Media Presentation Description (MPD) fragment, and wherein the MPD fragment comprises content ID information for identifying the content of the at least one component, and the type of the content ID information comprises at least one of an EIDR type using an EIDR ID registered in the EIDR registry as a content ID, an Ad-ID type using an Ad-ID registered in Ad-ID system as a content ID, or a user private ID type using an ID registered in a user private system as a content ID.

13. A digital receiver for receiving data, the digital receiver comprising:

a tuner configured to receive a broadcast signal comprising at least one component, SLS (service layer signaling) information and SLT (service list table) information, wherein the SLS information comprises information for discovery and acquisition of the at least one component, wherein the at least one component relates to audio data or video data;

wherein the SLT information comprises bootstrap information for acquiring the SLS information, wherein the SLS information comprises a Service-based Transport Session Instance Description (S-TSID) fragment, wherein the S-TSID fragment comprises a first element comprising information on a ROUTE session in which the at least one component is carried and a second element comprising information on at least one LCT channel that carries the at least one component, further the second element comprises a source flow element comprising information about a source flow, wherein the source flow element comprises a ContentInfo element for providing information for a content carried in at least one LCT channel, and wherein the ContentInfo element comprises an Advanced Emergency Alert (AEA) message ID for representing an identifier of at least one AEA message; and a processor configured to process the broadcast signal.

14. The digital receiver of claim 13, wherein the ContentInfo element comprises representation ID information indicating a representation ID of a DASH representation carried in at least one LCT channel.

15. The digital receiver of claim 14, wherein the ContentInfo element further comprises language information indicating a language of the DASH representation and type information indicating a type of the DASH representation.

16. The digital receiver of claim 15, wherein the SLS information further comprises a Media Presentation Description (MPD) fragment, and wherein the MPD fragment comprises content ID information for identifying the content of the at least one component, and the type of the content ID information comprises at least one of an EIDR type using an EIDR ID registered in the EIDR registry as a content ID, an Ad-ID type using an Ad-ID registered in Ad-ID system as a content ID, or a user private ID type using an ID registered in a user private system as a content ID.

* * * * *